(12) United States Patent
Noriki et al.

(10) Patent No.: US 10,830,951 B2
(45) Date of Patent: Nov. 10, 2020

(54) OPTICAL CIRCUIT AND OPTICAL DEVICE

(71) Applicants: NATIONAL INSTITUTE OF ADVANCED INDUSTRIAL SCIENCE AND TECHNOLOGY, Tokyo (JP); PHOTONICS ELECTRONICS TECHNOLOGY RESEARCH ASSOCIATION, Tokyo (JP)

(72) Inventors: Akihiro Noriki, Ibaraki (JP); Takeru Amano, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/343,998

(22) PCT Filed: Oct. 16, 2017

(86) PCT No.: PCT/JP2017/037374
§ 371 (c)(1),
(2) Date: Jul. 23, 2019

(87) PCT Pub. No.: WO2018/083966
PCT Pub. Date: May 11, 2018

(65) Prior Publication Data
US 2019/0339450 A1 Nov. 7, 2019

(30) Foreign Application Priority Data
Nov. 2, 2016 (JP) .................................. 2016-215055

(51) Int. Cl.
*G02B 6/12* (2006.01)
*G02B 6/122* (2006.01)
*G02B 6/42* (2006.01)

(52) U.S. Cl.
CPC ........... *G02B 6/122* (2013.01); *G02B 6/4206* (2013.01); *G02B 2006/12104* (2013.01)

(58) Field of Classification Search
CPC ................. G02B 6/122; G02B 6/4206; G02B 2006/12104
(Continued)

(56) References Cited

U.S. PATENT DOCUMENTS

| | | | |
|---|---|---|---|
| 6,504,107 B1* | 1/2003 | Kragl ..................... | G02B 6/423 174/260 |
| 2005/0116311 A1* | 6/2005 | Kim .................... | G02B 6/12002 257/466 |
| 2013/0343697 A1* | 12/2013 | Ishibashi ............ | G02B 6/12004 385/14 |

FOREIGN PATENT DOCUMENTS

| | | |
|---|---|---|
| JP | 2003-139980 A | 5/2003 |
| JP | 2004-061711 A | 2/2004 |

(Continued)

OTHER PUBLICATIONS

PCT International Search Report (with English Translation) and Written Opinion, International Application No. PCT/JP2017/037374, dated Nov. 14, 2017, 9 Pages.
(Continued)

*Primary Examiner* — Jerry M Blevins
(74) *Attorney, Agent, or Firm* — Fenwick & West LLP

(57) ABSTRACT

An optical circuit includes a substrate, a waveguide, and a mirror. The substrate includes a first surface. The waveguide includes a first core. The first core is formed of a semiconductor material. The waveguide is over a first surface of the substrate. The mirror reflects light emitted from the waveguide in a direction away from the first surface of the substrate. The mirror is a concave mirror. The waveguide includes a region that functions as an SSC.

7 Claims, 31 Drawing Sheets

(58) Field of Classification Search
USPC .......................................................... 385/28
See application file for complete search history.

(56) References Cited

FOREIGN PATENT DOCUMENTS

| | | | | |
|---|---|---|---|---|
| JP | 2009-139413 A | 6/2009 | | |
| JP | 2009139413 A | * | 6/2009 | ............. G02B 6/122 |
| JP | 2009-265275 A | 11/2009 | | |
| JP | 2015-509619 A | 3/2015 | | |
| JP | 2016-170307 A | 9/2016 | | |
| WO | WO-2016/070186 A1 | 5/2015 | | |
| WO | WO-2016/010612 A1 | 1/2016 | | |
| WO | WO-2016/147300 A1 | 9/2016 | | |

OTHER PUBLICATIONS

Chao, L., et al., "CMOS-compatible high efficiency double-etched apodized waveguide grating coupler," Opt. Express, 2013, pp. 7868-7874, vol. 21, No. 7.

* cited by examiner

FIG. 24
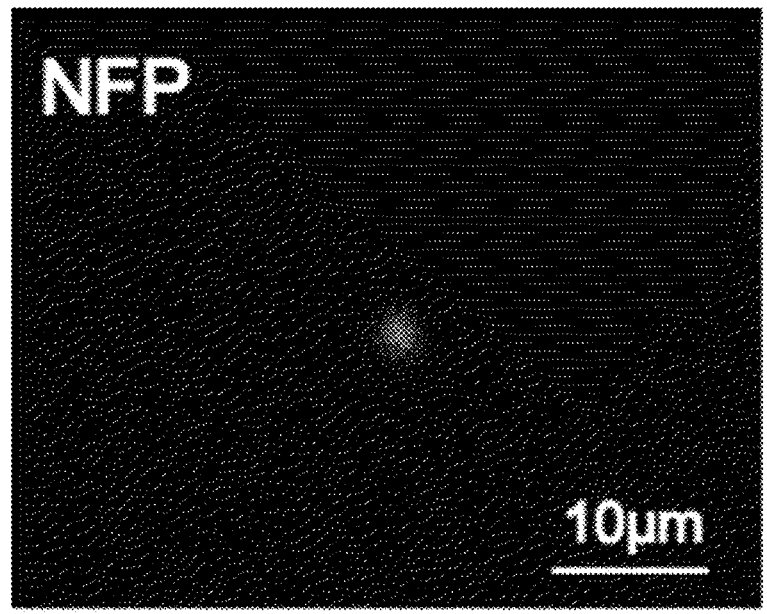
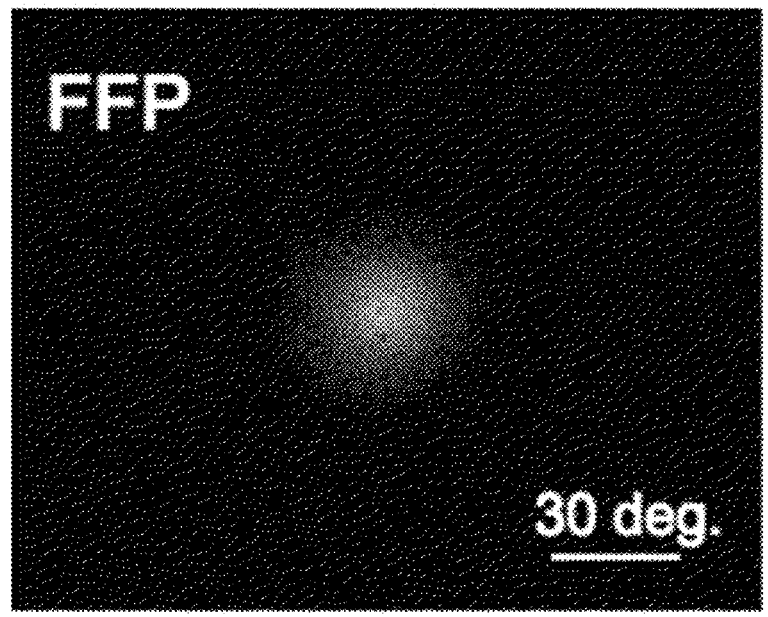

FIG. 25
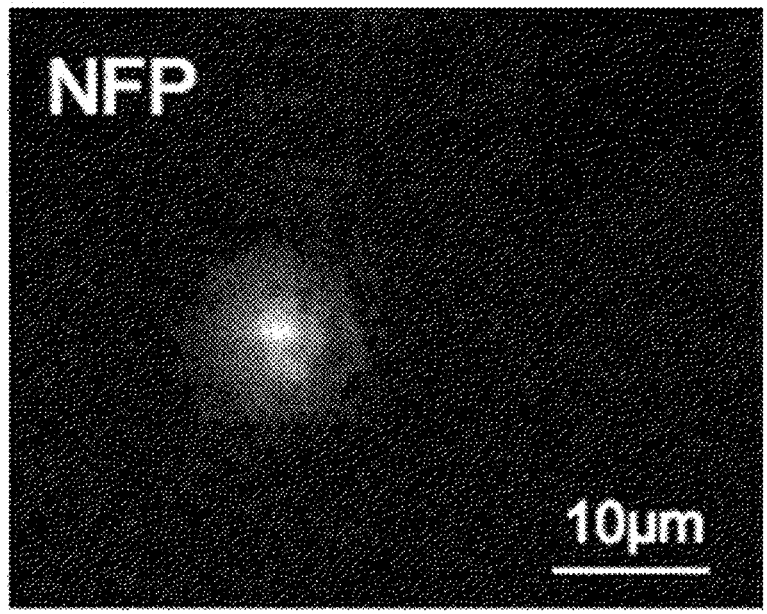
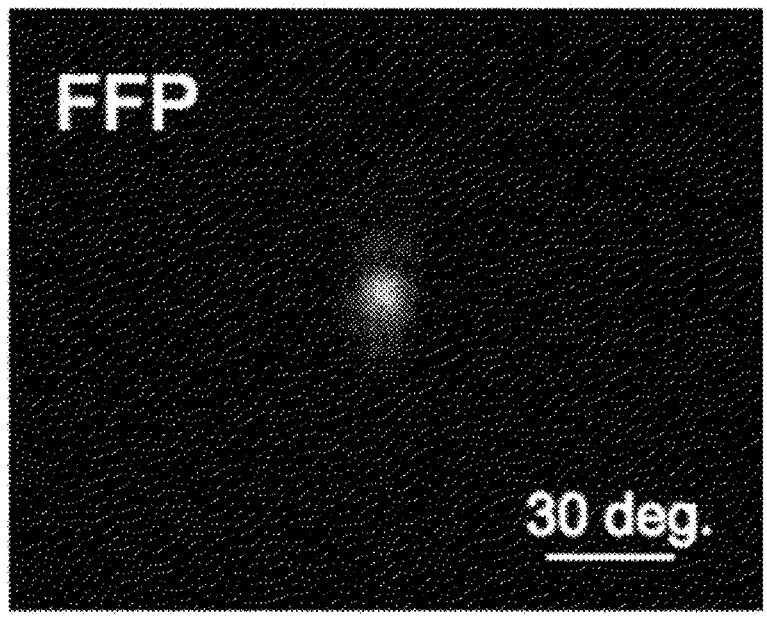

OPTICAL CIRCUIT AND OPTICAL DEVICE

TECHNICAL FIELD

The present invention relates to an optical circuit and an optical device.

BACKGROUND ART

In recent years, an optical circuit is developed as one of the optical communication technologies. In the optical circuit, light is propagated using a waveguide over a substrate. Specifically, in recent years, silicon photonics, in which various optical devices are integrated over a silicon chip, attracts attention. More specifically, in the silicon photonics, silicon is used as a core of the waveguide, and thus a size of the optical circuit can be reduced.

In order to input the light from the optical circuit to an external element of the optical circuit and to input the light from the external element of the optical circuit to the optical circuit, an optical input and output (optical I/O) technology is necessary. Specifically, in recent years, an optical I/O in a direction intersecting a surface of the substrate, more specifically, in a direction approximately orthogonal to the surface of the substrate, attracts attention. The optical I/O has an advantage in that, for example, many optical I/O ports can be provided or the plurality of optical I/O ports can be arranged at high density.

Non-patent Document 1 discloses one example of the optical I/O in the direction intersecting the surface of the substrate. A waveguide of an optical circuit in the example includes a core formed of silicon. A grating is formed in the waveguide. Light propagated through the waveguide is diffracted by the grating and is emitted toward a direction away from the surface of the substrate. Thus, in Non-patent Document 1, the optical I/O is realized in the direction intersecting the surface of the substrate.

Patent Document 1 discloses one example of the optical I/O in the direction intersecting the surface of the substrate. A waveguide of an optical circuit in the example includes a core formed of an organic resin. Light emitted from an end of the waveguide is reflected by a mirror toward a direction away from the surface of the substrate. Thus, in Patent Document 1, the optical I/O is realized in the direction intersecting the surface of the substrate.

RELATED DOCUMENT

Patent Document

[Patent Document 1] Japanese Unexamined Patent Publication No. 2003-139980

Non-Patent Document

[Non-Patent Document 1] Chao Li, et. al., "CMOS-compatible high efficiency double-etched apodized waveguide grating coupler," Opt. Express 21, 7868-7874 (2013)

SUMMARY OF THE INVENTION

Technical Problem

As described above, in recent years, an optical I/O in a direction intersecting a surface of a substrate attracts attention. In the optical I/O, it is desired that an optical coupling efficiency is independent of a wavelength and a polarized wave of light. From a perspective of reducing a size of the optical circuit, for example, it is desired that the optical circuit is manufactured using a semiconductor manufacturing technology.

An object of the present invention is to manufacture an optical circuit using a semiconductor manufacturing technology, and to realize an optical I/O of which an optical coupling efficiency is largely independent of a wavelength and a polarized wave of light in a direction intersecting a surface of the substrate.

Solution to Problem

According to the present invention,
there is provided an optical circuit including:
a substrate including a first surface;
a waveguide over the first surface of the substrate, the waveguide including a first core formed of a semiconductor material; and
a mirror reflecting light emitted from the waveguide in a direction away from the first surface of the substrate.

According to the present invention,
there is provided an optical device including:
an optical circuit; and
an element outside the optical circuit,
in which the optical circuit includes:
a substrate including a first surface;
a waveguide over the first surface of the substrate, the waveguide including a first core formed of a semiconductor material; and
a mirror reflecting light emitted from the waveguide in a direction away from the first surface of the substrate,
in which the light reflected by the mirror is input to the element.

Advantageous Effects of Invention

According to the present invention, an optical circuit is manufactured using a semiconductor manufacturing technology, and an optical I/O of which an optical coupling efficiency is largely independent of a wavelength and a polarized wave of is realized in a direction intersecting a surface of a substrate.

BRIEF DESCRIPTION OF THE DRAWINGS

The above-described object, other objects, features, and advantages will be further apparent with preferable example embodiments, which will be described below, and the accompanying drawings below.

FIG. 24 is a view illustrating a property of spot size conversion by the optical member illustrated in FIG. 23.

FIG. 25 is a view illustrating a property of spot size conversion by the optical member illustrated in FIG. 23.

DESCRIPTION OF EMBODIMENTS

Figure 1:
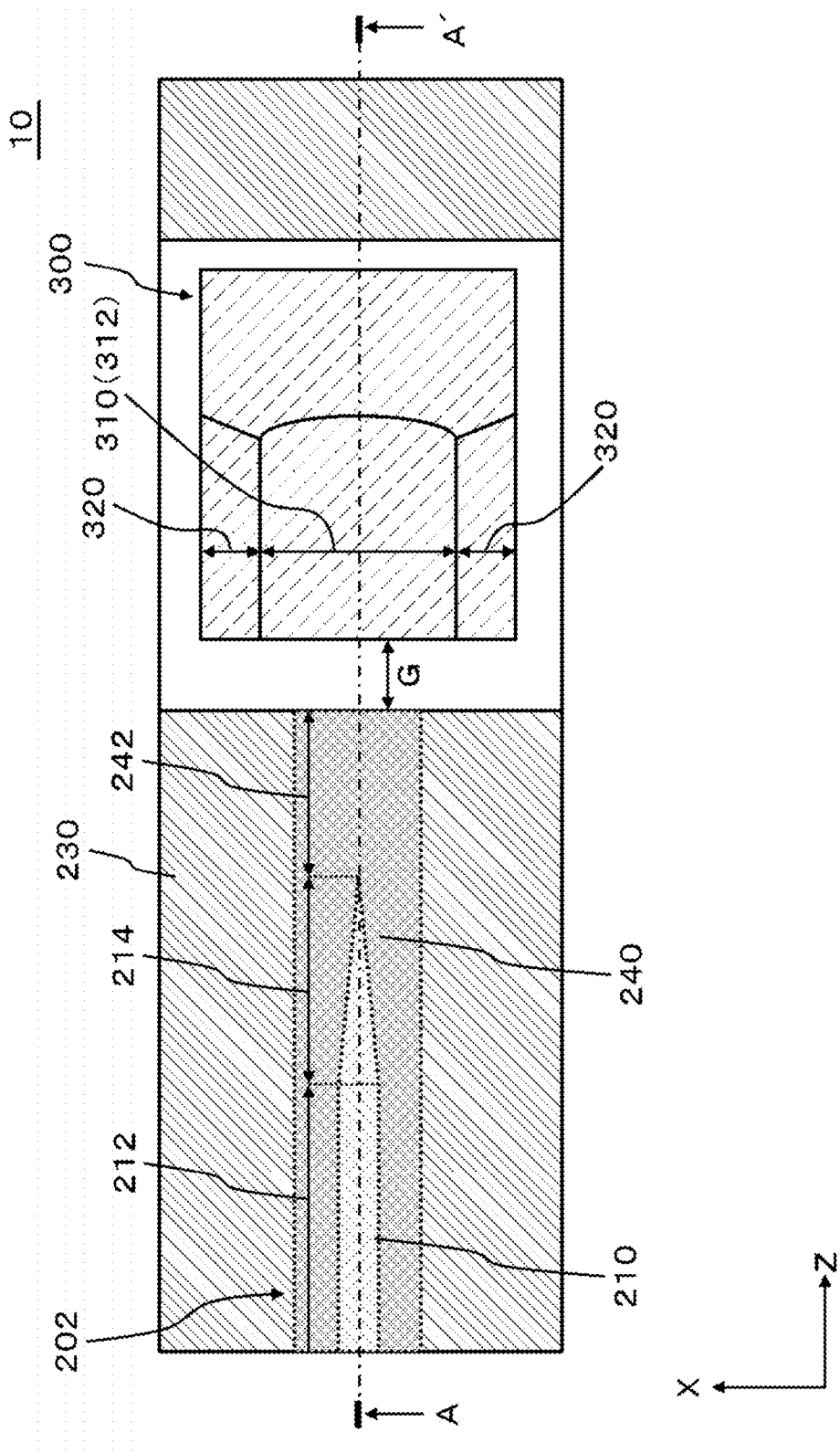
FIG. 1 is a plan view illustrating an optical circuit according to a first example embodiment.

Hereinafter, example embodiments of the present invention will be described with reference to the accompanying drawings. Also, the same reference numerals are attached to the same components throughout the drawings, and the description thereof will not be repeated.

In the specification, unless specifically mentioned, a "spot size" indicates a mode field diameter of a constriction part of a beam for the beam propagated in a free space (for example, a space on an outside of a waveguide), and indicates a mode file diameter of propagation light for the propagation light propagated in the waveguide.

First Example Embodiment

Figure 2:
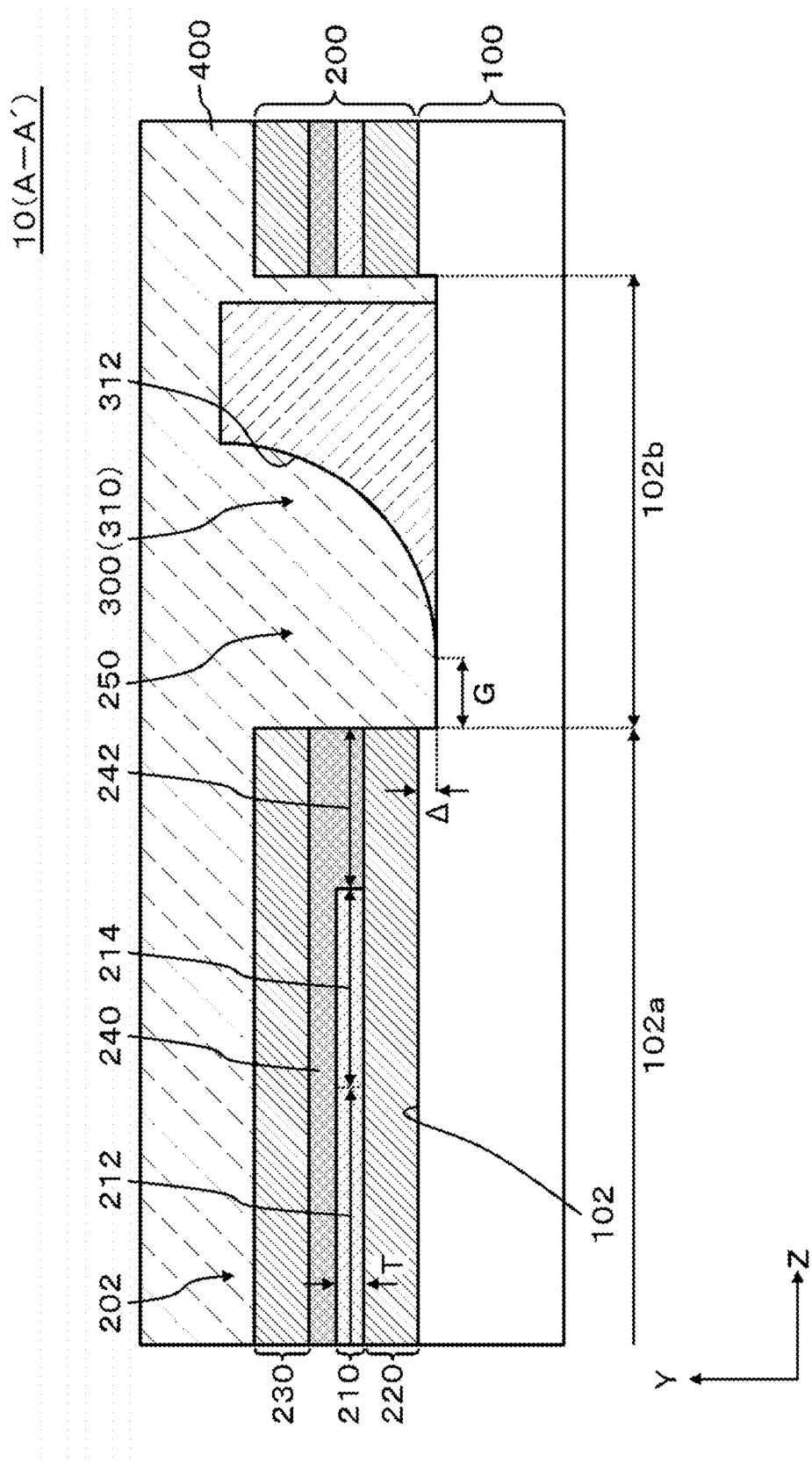
FIG. 2 is a cross-sectional view taken along A-A' of FIG. 1.

FIG. 1 is a plan view illustrating an optical circuit 10 according to a first example embodiment. FIG. 2 is a cross-sectional view taken along A-A' of FIG. 1. In FIG. 1, for description, a sealing layer 400 (FIG. 2) is removed, and a first core layer 210 and a second core layer 240 are illustrated using broken lines. As will be described with reference to FIG. 2, an upper surface of the first core layer 210 is covered by the second core layer 240, and an upper surface of the second core layer 240 is covered by a clad layer 230.

An outline of the optical circuit 10 will be described with reference to FIG. 2. The optical circuit 10 includes a substrate 100, a waveguide 202, and a mirror 312. The substrate 100 includes a first surface 102. The waveguide 202 includes a first core 212. The first core 212 is formed of a semiconductor material. The waveguide 202 is over the first surface 102 of the substrate 100. The mirror 312 reflects light emitted from the waveguide 202 toward a direction away from the first surface 102 of the substrate 100.

According to the above configuration, the optical circuit 10 is manufactured using a semiconductor manufacturing technology. Specifically, the first core 212 is formed of the semiconductor material, in other words, the first core 212 is formed using the semiconductor manufacturing technology. Thus, according to the above configuration, the optical circuit 10 is manufactured using the semiconductor manufacturing technology.

Furthermore, according to the above configuration, an optical I/O is realized in a direction intersecting the first surface 102 of the substrate 100. Specifically, the light emitted from the waveguide 202 is reflected by the mirror 312 toward above the first surface 102 of the substrate 100. The light can be also reflected toward the waveguide 202 from above the first surface 102 of the substrate 100 using the mirror 312. Thus, according to the above configuration, the optical I/O is realized in the direction intersecting the first surface 102 of the substrate 100.

Furthermore, according to the above configuration, an optical coupling efficiency between the optical circuit 10 and an external element of the optical circuit 10 is largely independent of a wavelength and a polarized wave of the light. Specifically, a direction of the light emitted from the waveguide 202 and a direction of the light from above the first surface 102 of the substrate 100 are changed by the mirror 312. In other words, in the above configuration, the direction of the light emitted from the waveguide 202 and the direction of the light from above the first surface 102 of the substrate 100 can be changed without using a grating. If the direction of the light is changed using the grating, the optical coupling efficiency strongly depends on the wavelength and the polarized wave of the light. In contrast, according to the above configuration, the direction of the light is changed using the mirror 312. Thus, according to the above configuration, the optical coupling efficiency between the optical circuit 10 and the external element of the optical circuit 10 is largely independent of the wavelength and the polarized wave of the light.

In the above configuration, a mode of the light propagated between the optical circuit 10 and the external element of the optical circuit 10 is a single mode. Hereinafter, description will be performed while assuming that the mode of the light propagated between the optical circuit 10 and the external element of the optical circuit 10 is the single mode.

In the example illustrated in FIG. 2, the mirror 312 is a concave mirror and, more specifically, a shape of the mirror 312 is a concave elliptical sphere or a concave sphere. Therefore, a spot size of the light emitted from the waveguide 202 can be converted by the mirror 312. Specifically, the light is emitted from an end of the waveguide 202 at a determined divergence angle. The end of the mirror 312 is spaced apart from the end of the waveguide 202 by a distance G. The distance G is adjusted such that a beam diameter of the light emitted from the end of the waveguide 202 is enlarged to a desired beam diameter when reaching the mirror 312. When the light is reflected by the mirror 312, the spot size of the light is converted by a concave surface (curved surface) of the mirror 312 and, specifically, the spot size of the light becomes larger than the spot size of the light emitted from the end of the waveguide 202. Thus, the light from the optical circuit 10 is propagated toward the external element of the optical circuit 10.

If the mirror 312 is the concave mirror, a spot size of the light from above the first surface 102 of the substrate 100 can be converted by the mirror 312. Specifically, when the light from above the first surface 102 of the substrate 100 is reflected by the mirror 312, the spot size of the light is converted by the concave surface (curved surface) of the mirror 312. The light is condensed toward the waveguide 202. The end of the waveguide 202 is spaced apart from the end of the mirror 312 by the distance G. The distance G is adjusted such that the beam diameter of the light reflected by the mirror 312 is reduced to the desired beam diameter when reaching the end of the waveguide 202, specifically such that a location of a focus of the light reflected by the mirror 312 approximately coincides with a location of the end of the waveguide 202. Thus, the external element of the light from the optical circuit 10 is propagated toward the optical circuit 10.

According to the above configuration, the optical coupling efficiency can be high between the optical circuit 10 and the external element of the optical circuit 10. Specifically, a spot size for coupling with the waveguide 202 of the optical circuit 10 at the high optical coupling efficiency may be smaller than a spot size for coupling with the external element of the optical circuit 10 at the high optical coupling efficiency. In this case, even if the light is propagated between the optical circuit 10 (waveguide 202) and the external element of the optical circuit 10, the optical coupling efficiency between the optical circuit 10 and the external element of the optical circuit 10 is not much high when the spot size of the light is not converted. In contrast, according to the above configuration, the mirror 312 can convert the spot size of the light from the optical circuit 10 (the waveguide 202) into a spot size optimal to the external element of the optical circuit 10 (that is, the spot size for coupling with the external element of the optical circuit 10 at the high optical coupling efficiency), and can convert the spot size of the light from the external element of the optical circuit 10 into a spot size optimal to the optical circuit 10 (the waveguide 202) (that is, the spot size for coupling with the waveguide 202 of the optical circuit 10 at the high optical coupling efficiency). Thus, the optical coupling efficiency between the optical circuit 10 and the external element of the optical circuit 10 can be high.

Furthermore, in the example illustrated in FIG. 2, the waveguide 202 includes a region that functions as a Spot Size Converter (SSC) 214. The SSC 214 enlarges the spot size of light propagated from the first core 212 to the mirror 312.

According to the above configuration, the optical coupling efficiency can be high between the optical circuit 10 and the external element of the optical circuit 10. Specifically, the SSC 214 enlarges the spot size of the light propagated from the first core 212 to the mirror 312. Therefore, even if a cross-sectional area of the first core 212 is small, a divergence angle of the light emitted from the end of the waveguide 202 can be reduced to some extent. In other words, if the SSC 214 is not provided and the cross-sectional area of the first core 212 is small, the light is emitted from the end of the waveguide 202 with a large divergence angle due to diffraction. In this case, some of the light emitted from the end of the waveguide 202 is deviated to the outside of the mirror 312, and thus the optical coupling efficiency is lowered. In contrast, if the SSC 214 is provided, the divergence angle of the light emitted from the end of the waveguide 202 is reduced to some extent, and thus almost all of the light emitted from the end of the waveguide 202 is reflected by the mirror 312. Thus, according to the above configuration, the optical coupling efficiency can be high between the optical circuit 10 and the external element of the optical circuit 10.

Furthermore, according to the above configuration, a length of the SSC 214 can be prevented from being long. Specifically, the waveguide 202 includes the SSC 214 and the mirror 312 is the concave mirror. Therefore, the spot size of the light propagated from the first core 212 is enlarged by not only the SSC 214 but also the mirror 312. Generally, the longer the length of the SSC is, the larger a magnification of the spot size is. In contrast, according to the above configuration, not only the SSC 214 but also the mirror 312 functions to enlarge the spot size. Therefore, even if the SSC 214 is not much long, it is possible to acquire the magnification desired for the spot size. Thus, according to the above configuration, the length of the SSC 214 can be prevented from being long.

Next, a plane structure of the optical circuit 10 will be described in detail with reference to FIG. 1. The optical circuit 10 includes the first core layer 210, the clad layer 230, the second core layer 240, and an optical member 300.

The first core layer 210 includes a region that functions as the first core 212, and a region that functions as the SSC 214. A width of the first core 212 is almost constant in an extension direction of the waveguide 202 regardless of a location. In contrast, a width of the SSC 214 is reduced from the first core layer 210 side toward the optical member 300 side. The SSC 214 is provided to enlarge the spot size of the light traveling from the first core 212 side toward the optical member 300 side.

The clad layer 230 includes a region that covers one of both side surfaces of the second core layer 240, and a region that covers another of the both side surfaces of the second core layer 240. As will be described with reference to FIG. 2, the clad layer 230 includes also a region that covers an upper surface of the second core layer 240.

The second core layer 240 includes a region that covers both side surfaces of the first core layer 210 and a region that functions as a second core 242. The second core 242 is between the SSC 214 and the optical member 300. Light transmitted from the SSC 214 is propagated through the second core 242. As will be described with reference to FIG. 2, the second core layer 240 includes also a region that covers the upper surface of the first core layer 210.

The optical member 300 includes a first portion 310. A surface of the first portion 310 is a curved surface, and is coated by a reflection layer, specifically, for example, a metal layer (for example, an Al layer, an Au layer, or a Cu layer, preferably, for example, the Al layer). Thus, the surface of the first portion 310 functions as the mirror 312.

The optical member 300 includes two second portions 320. The two second portions 320 are located opposite to each other across the first portion 310. The second portions 320 are provided such that a shape of an edge of the surface of the first portion 310, specifically a shape of a region from the first portion 310 to the second portions 320, is stably formed in a designed shape. Specifically, the optical member 300 is formed by photolithography. If the second portions 320 are not provided, the shape of the edge of the first portion 310 may not be formed in the designed shape. In contrast, if the second portions 320 are provided, the shape of the edge of the first portion 310 is stably formed in the designed shape. From a viewpoint of the object, it is not necessary that the shapes of the surfaces of the second portions 320 are the same as the shape of the surface of the first portion 310, and the shapes of the surfaces of the second portions 320 are different from the shape of the surface of the first portion 310 in the example illustrated in FIG. 1. In other words, it is not necessary that the second portions 320 function as the mirror.

Next, a cross-sectional structure of the optical circuit 10 will be described in detail with reference to FIG. 2. The optical circuit 10 includes the substrate 100, a layer 200, the optical member 300, and the sealing layer 400.

The substrate 100 includes the first surface 102. The first surface 102 includes a first region 102a and a second region 102b. In the first surface 102, a groove is formed in the second region 102b. Therefore, the second region 102b of the first surface 102 is located lower than the first region 102a of the first surface 102 by a height Δ.

The layer 200 includes a region that functions as the waveguide 202. The waveguide 202 is over the first region 102a of the substrate 100. The waveguide 202 includes the first core layer 210, the clad layer 220, the clad layer 230, and the second core layer 240.

The first core layer 210 includes a region that function as the first core 212, and a region that functions as the SSC 214.

The clad layer 220 includes a region that covers a lower surface of the first core layer 210 and a lower surface of the second core layer 240.

The clad layer 230 includes a region that covers an upper surface of the second core layer 240.

The second core layer 240 includes a region that covers the upper surface of the first core layer 210. The second core layer 240 also includes a region that functions as the second core 242 between the first core layer 210 and the mirror 312.

The optical member 300 is over the second region 102b of the substrate 100 in an opening 250 of the layer 200. Therefore, a bottom surface of the optical member 300 is located lower than the first region 102a of the substrate 100 by the height Δ. In the configuration, even if a height from the first region 102a of the substrate 100 to a center of the second core layer 240 changes depending on a thickness of the clad layer 220 or a thickness of the second core layer 240, a location of the mirror 312 can be adjusted by adjusting the height Δ. In other words, even if the height from the first region 102a of the substrate 100 to the center of the second core layer 240 changes depending on the thickness of the clad layer 220 or the thickness of the second core layer 240, it is not necessary to change a shape of the optical member 300. Specifically, in the example in the drawing, the height Δ is adjusted such that the center (height) of the mirror 312 almost coincides with a central location (height) of the second core layer 240.

The surface (the mirror 312) of the first portion 310 of the optical member 300 faces obliquely upward relative to the first surface 102 of the substrate 100. Therefore, the light emitted from the waveguide 202 can be reflected toward above the first surface 102 of the substrate 100 by the mirror 312. In other words, the optical I/O in the direction intersecting the surface (first surface 102) of the substrate 100 is realized.

The sealing layer 400 covers the first surface 102 of the substrate 100, the layer 200, and the optical member 300, thereby sealing the first surface 102 of the substrate 100, the layer 200, and the optical member 300. In one example, the sealing layer 400 is a resin layer and, specifically, is formed of a material through which the light propagated between the optical circuit 10 and the external element of the optical circuit 10 is transmittable.

The optical circuit 10 is formed using the semiconductor manufacturing technology, more specifically, the silicon photonics. As a specific example of a case where the silicon photonics are used, the first core 212 is formed of silicon. As a more specific example, the substrate 100 is a silicon substrate, the first core layer 210 is a silicon layer, the clad layer 220 is a silicon oxide layer ($SiO_2$ layer), the clad layer 230 is the silicon oxide layer ($SiO_2$ layer), and the second core layer 240 is the silicon oxide layer ($SiO_x$ layer) or a silicon oxynitride layer (SiON layer). In the example, a thickness T of the first core 212 is thin and is equal to or less than 500 nm in one example. From a viewpoint in which the light is propagated through the first core 212, it is preferable that the thickness T of the first core 212 is equal to or greater than 50 nm.

Figure 3:
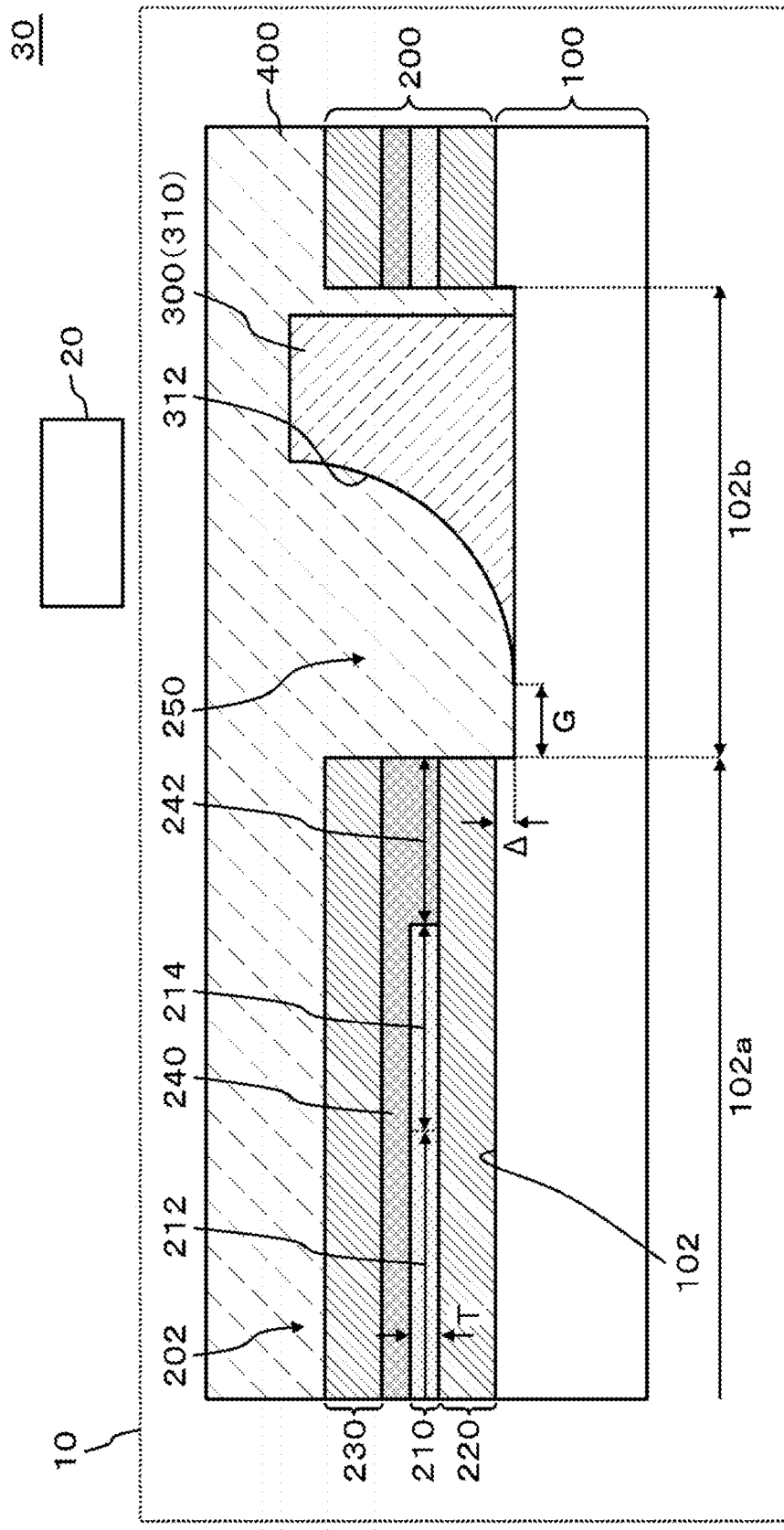
FIG. 3 is a view illustrating an optical device according to the first example embodiment.

FIG. 3 is a view illustrating an optical device 30 according to the present example embodiment. The optical device 30 includes the optical circuit 10 and an element 20. The optical circuit 10 illustrated in FIG. 3 is the same as the optical circuit 10 illustrated in FIG. 2. The element 20 is located on an outside of the optical circuit 10.

Figure 4:
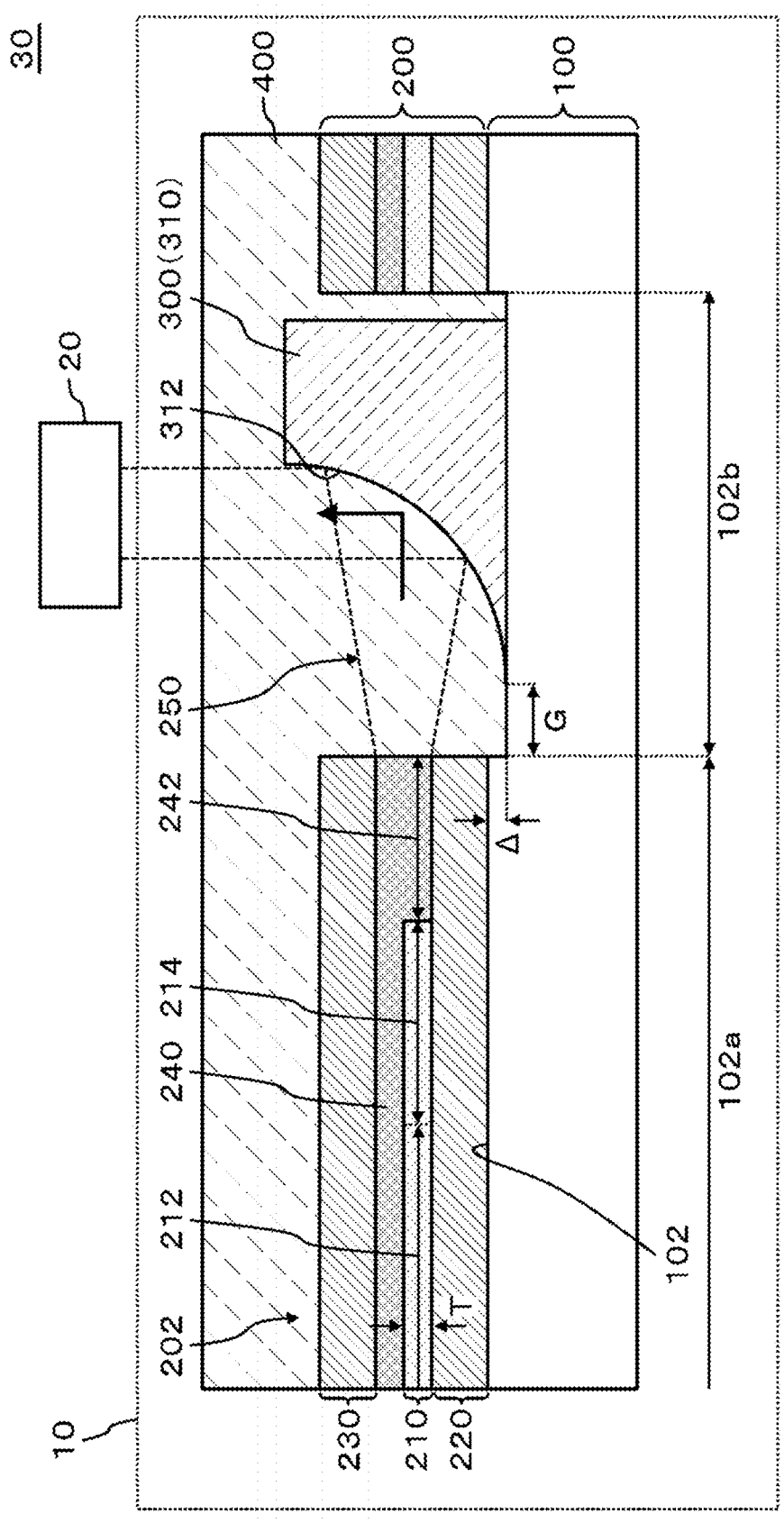
FIG. 4 is a view illustrating a first example of an operation of the optical device illustrated in FIG. 3.

FIG. 4 is a view illustrating a first example of an operation of the optical device 30 illustrated in FIG. 3. In the example, the light emitted from the waveguide 202 is reflected by the mirror 312 and is input to the element 20. Specifically, in the example illustrated in FIG. 4, since the SSC 214 is provided, the divergence angle of the light emitted from the end of the waveguide 202 is reduced to some extent as described above. Therefore, almost all of the light emitted from the end of the waveguide 202 is reflected by the mirror 312. Therefore, the optical coupling efficiency can be high between the optical circuit 10 and the element 20.

Figure 5:
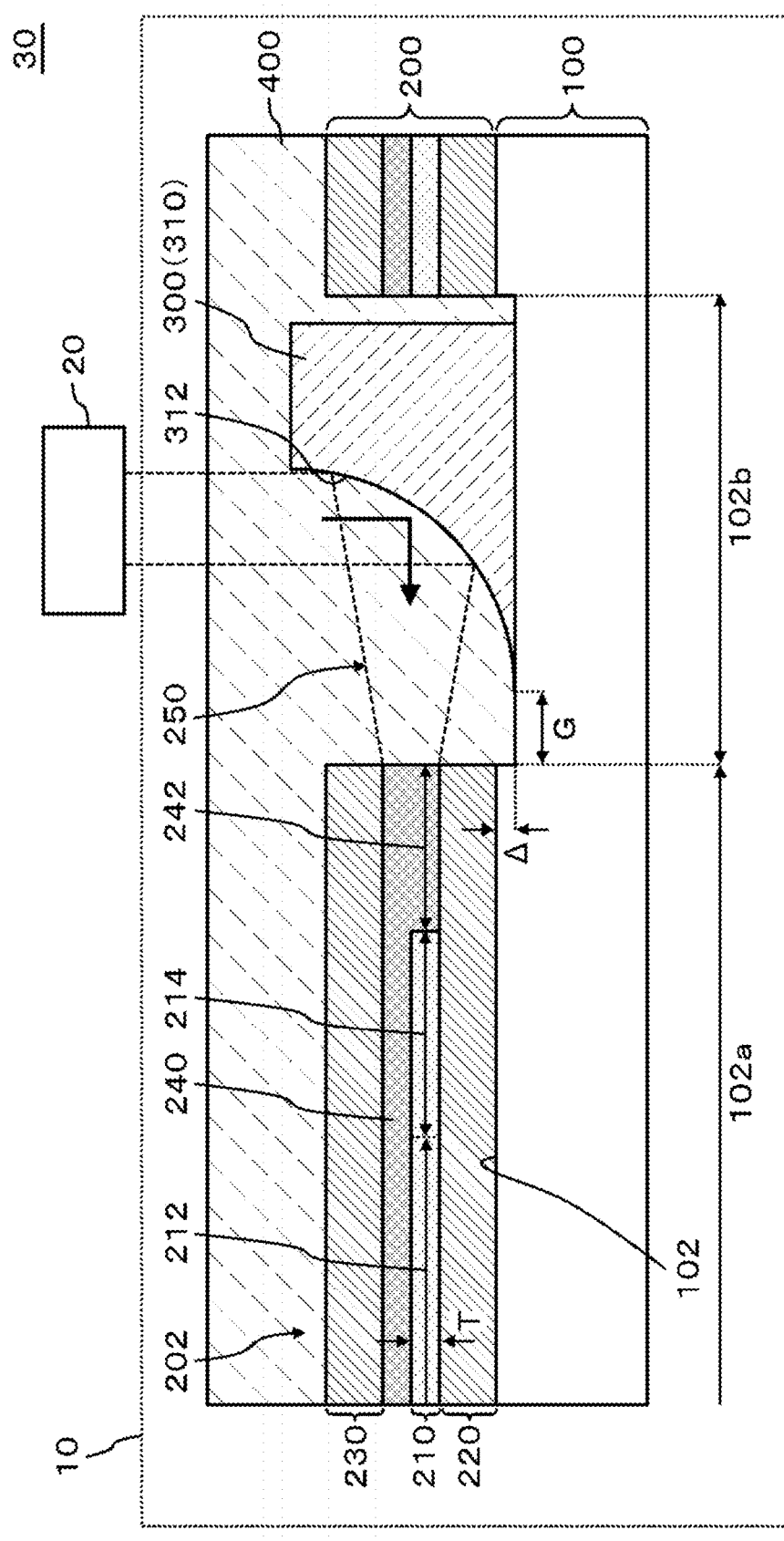
FIG. 5 is a view illustrating a second example of the operation of the optical device illustrated in FIG. 3.

FIG. 5 is a view illustrating a second example of the operation of the optical device 30 illustrated in FIG. 3. In the example, the light emitted from the element 20 is reflected by the mirror 312 and is input to the waveguide 202.

FIGS. 6 to 10 are views illustrating one example of a method of manufacturing the optical circuit 10 illustrated in FIGS. 1 and 2. In the example, the optical circuit 10 is manufactured as follows.

Figure 6:
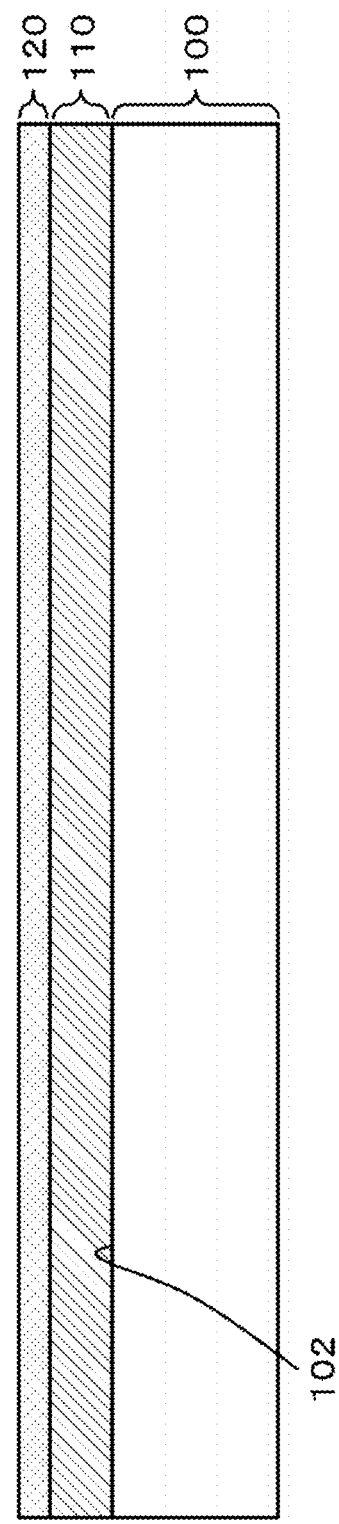
FIG. 6 is a view illustrating one example of a method of manufacturing the optical circuit illustrated in FIGS. 1 and 2.

First, as illustrated in FIG. 6, a Silicon On Insulator (SOI) substrate is prepared. The SOI substrate includes the substrate 100, an insulation layer 110, and a semiconductor layer 120. The insulation layer 110 is over the first surface 102 of the substrate 100. The semiconductor layer 120 is over an upper surface of the insulation layer 110.

Figure 7:
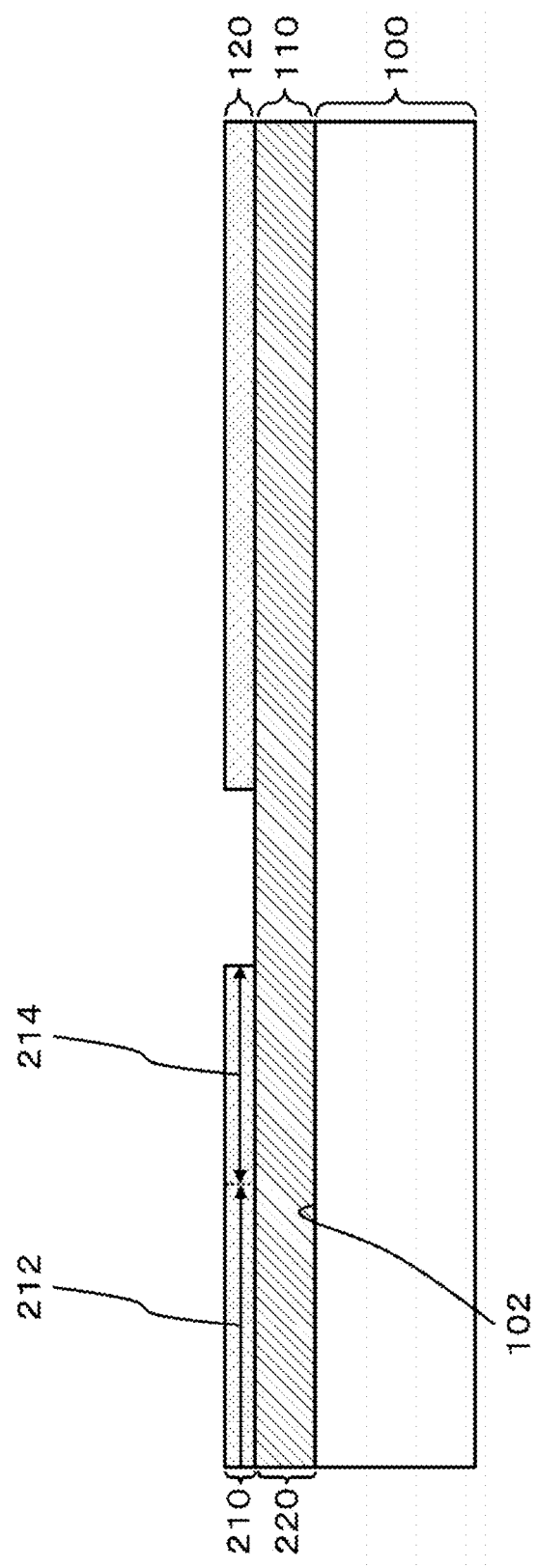
FIG. 7 is a view illustrating one example of the method of manufacturing the optical circuit illustrated in FIGS. 1 and 2.

Then, as illustrated in FIG. 7, the semiconductor layer 120 is patterned using the semiconductor manufacturing technology, specifically, the photolithography, and the first core 212 and the SSC 214 are formed. The insulation layer 110 functions as the clad layer 220 and the semiconductor layer 120 functions as the first core layer 210.

Figure 8:
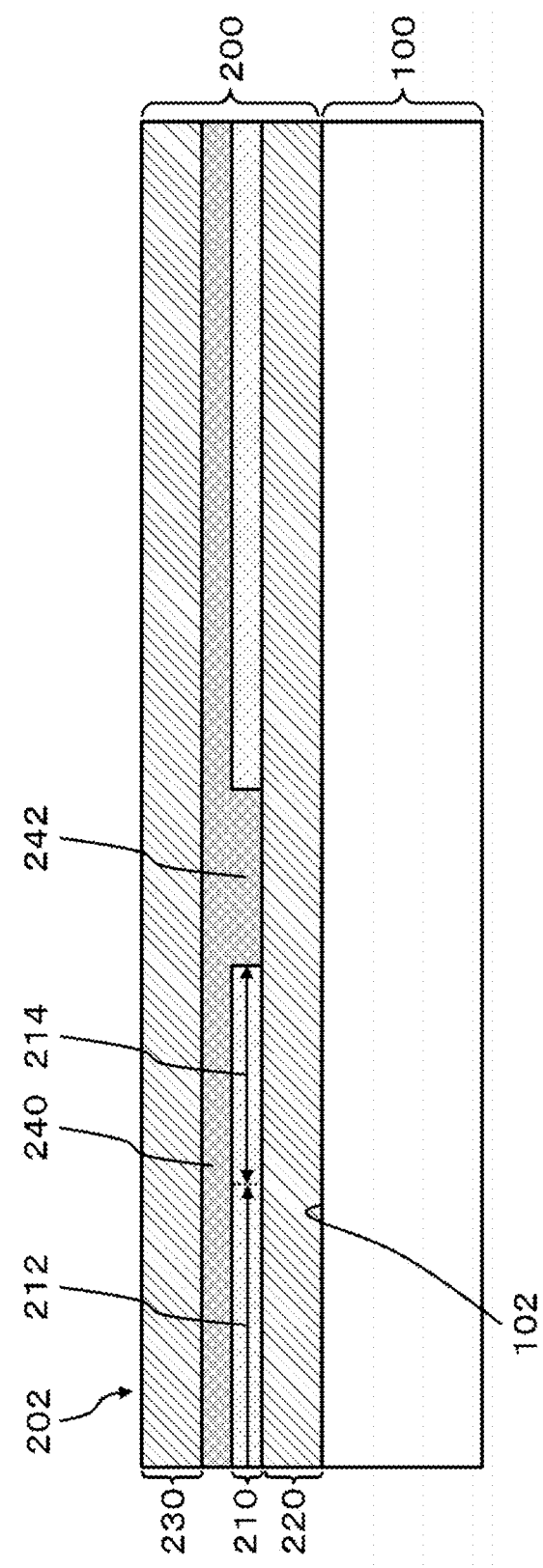
FIG. 8 is a view illustrating one example of the method of manufacturing the optical circuit illustrated in FIGS. 1 and 2.

Then, as illustrated in FIG. 8, the second core layer 240 and the clad layer 230 are formed. In one example, the second core layer 240 is formed by a Chemical Vapor Deposition (CVD) and patterning. In one example, the clad layer 230 is formed by the CVD. Thus, the layer 200 (the first core layer 210, the clad layer 220, the clad layer 230, and the second core layer 240) is formed over the first surface 102 of the substrate 100.

Figure 9:
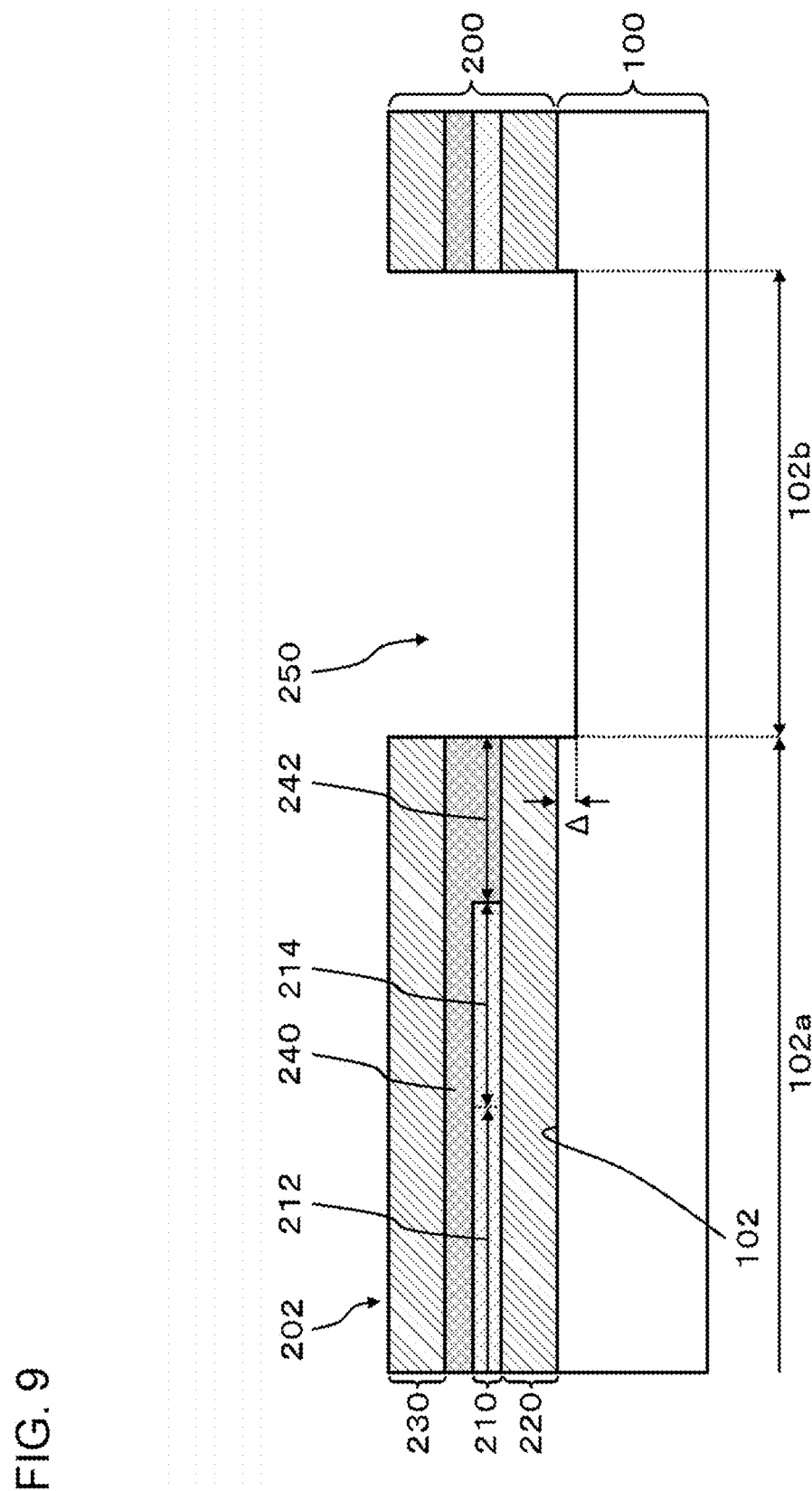
FIG. 9 is a view illustrating one example of the method of manufacturing the optical circuit illustrated in FIGS. 1 and 2.

Then, as illustrated in FIG. 9, the opening 250 is formed in the layer 200. The opening 250 is formed by etching the layer 200. Furthermore, the groove is formed in the first surface 102 of the substrate 100 by etching the first surface 102 of the substrate 100 in the opening 250. Therefore, the second region 102b of the substrate 100 (that is, a region that overlaps the opening 250) is located lower than the first region 102a of the substrate 100 (that is, a region that does not overlap the opening 250) by the height Δ.

Figure 10:
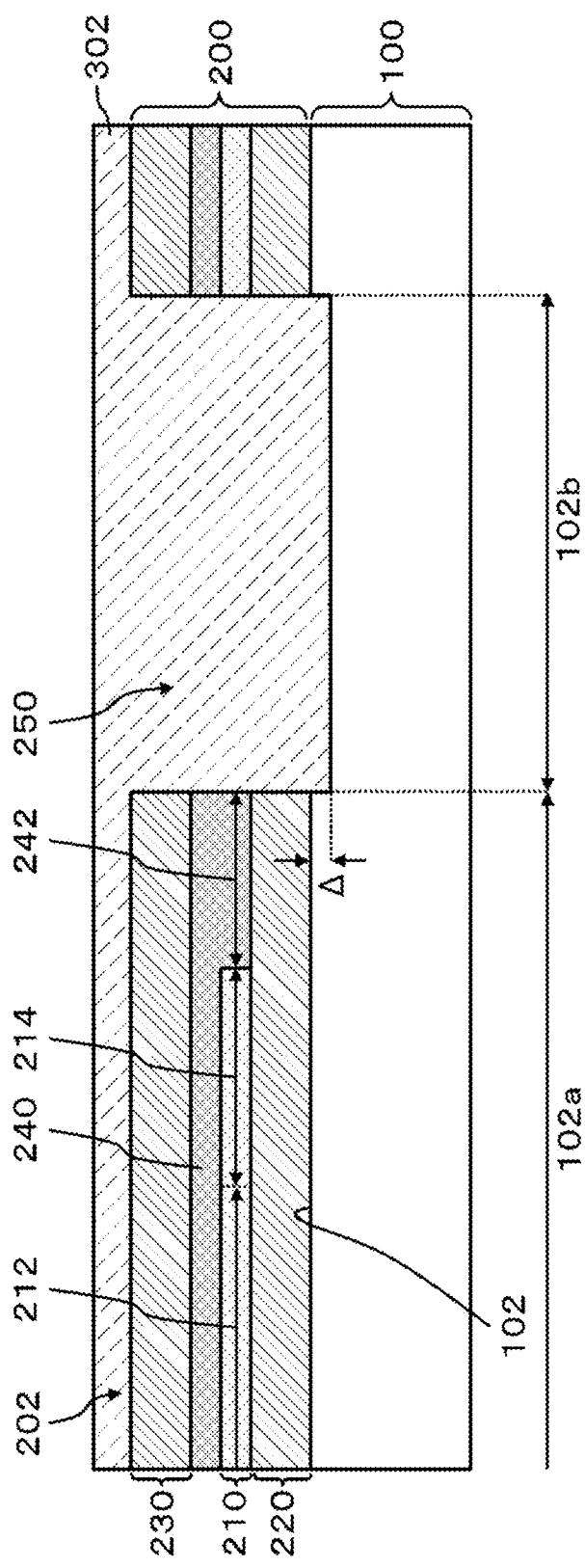
FIG. 10 is a view illustrating one example of the method of manufacturing the optical circuit illustrated in FIGS. 1 and 2.

Then, as illustrated in FIG. 10, the resin layer 302 is formed over the second region 102b of the substrate 100 and the layer 200. In one example, the resin layer 302 is formed by spin coating. The resin layer 302 includes a photosensitive resin (for example, a polyimide resin or an epoxy resin).

Then, the resin layer 302 is patterned by the photolithography, and a part of the surface of the resin layer 302 is formed as a curved surface (a surface that functions as the mirror 312). Specifically, first, the resin layer 302 is exposed using a mask. A light transmittance distribution of the mask changes depending on a location. Therefore, when the resin layer 302 is exposed using the mask, the quantity of light irradiated to the resin layer 302 varies depending on the location. Then, the resin layer 302 is developed. In this case, the part of the surface of the resin layer 302 is formed as the curved surface (a region that functions as the mirror 312) depending on a difference in the quantity of irradiated light. As described above, if the second portions 320 are formed together with the first portion 310, a shape of an edge of the surface of first portion 310, specifically a shape of a region from the first portion 310 to the second portions 320 is stably formed in a designed shape.

Then, the reflection layer, specifically, a metal layer is coated over the surface of the first portion 310. Therefore, the mirror 312 is formed. Specifically, first, a region other than the resin layer 302 is covered by the mask such that the metal layer is not coated over the region other than the resin layer 302, particularly, the end of the waveguide 202. Then, the metal layer is deposited by evaporation. Thus, the reflection layer, specifically, the metal layer is coated over the surface of the first portion 310.

Thus, the optical circuit 10 illustrated in FIGS. 1 and 2 is manufactured.

Figure 11:
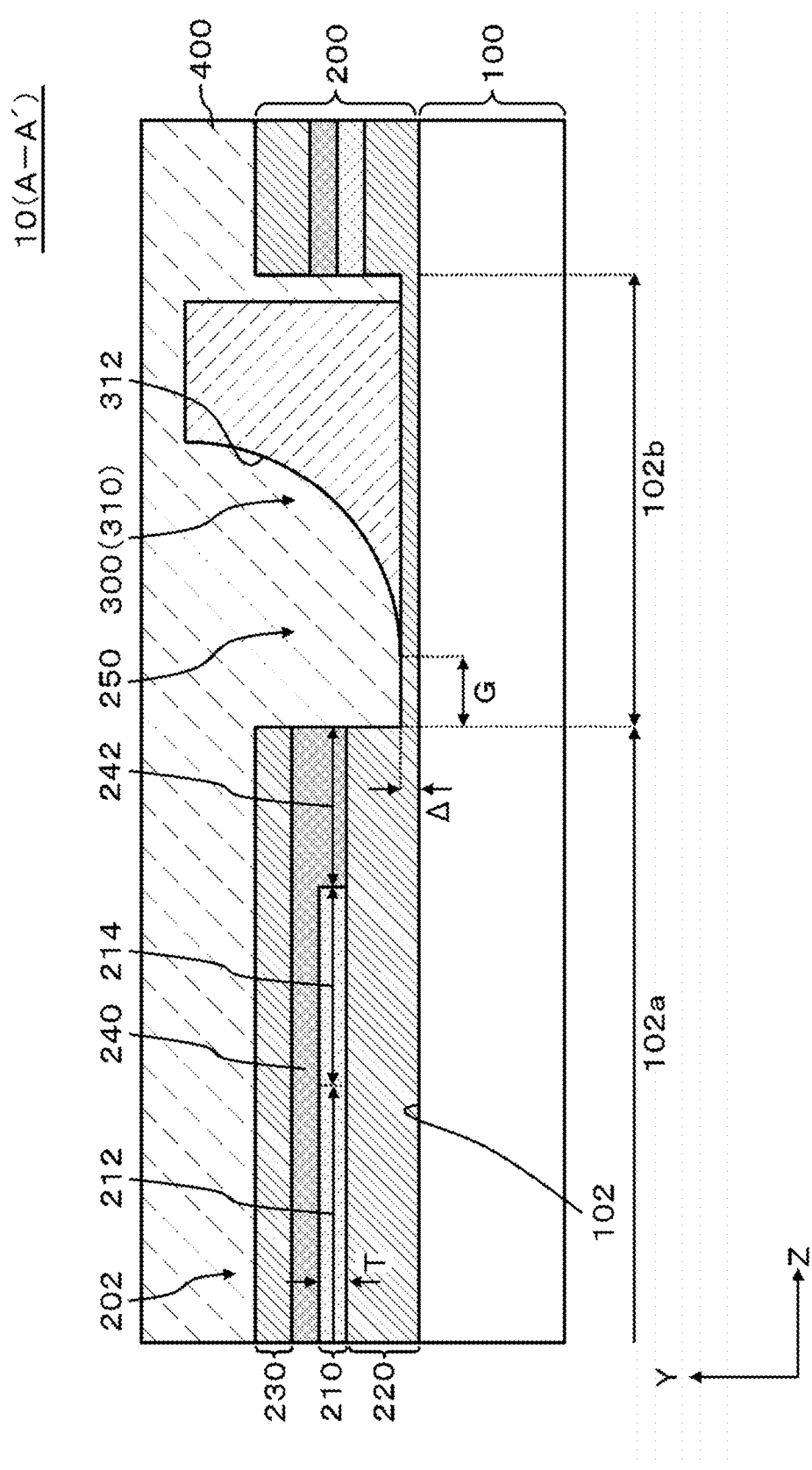
FIG. 11 is a view illustrating a modified example of FIG. 2.

FIG. 11 is a view illustrating a modified example of FIG. 2. In the example illustrated in the drawing, the first surface 102 of the substrate 100 is flat from the first region 102a to the second region 102b, and the bottom surface of the optical member 300 is located higher than the second region 102b of the substrate 100 by the height Δ. More specifically, a part of the clad layer 220 is located over the second region 102b of the substrate 100. Therefore, the bottom surface of the optical member 300 is located higher than the second region 102b of the substrate 100 by a thickness of this part of the clad layer 220 (that is, the height Δ). In the configuration, even if the height from the first region 102a of the substrate 100 to the center of the second core layer 240 changes depending on the thickness of the clad layer 220 or the thickness of the second core layer 240, the location of the mirror 312 can be adjusted by adjusting the height Δ. Specifically, in the example illustrated in the drawing, the height Δ is adjusted such that the center (height) of the mirror 312 almost coincides with the central location (height) of the second core layer 240.

Figure 12:
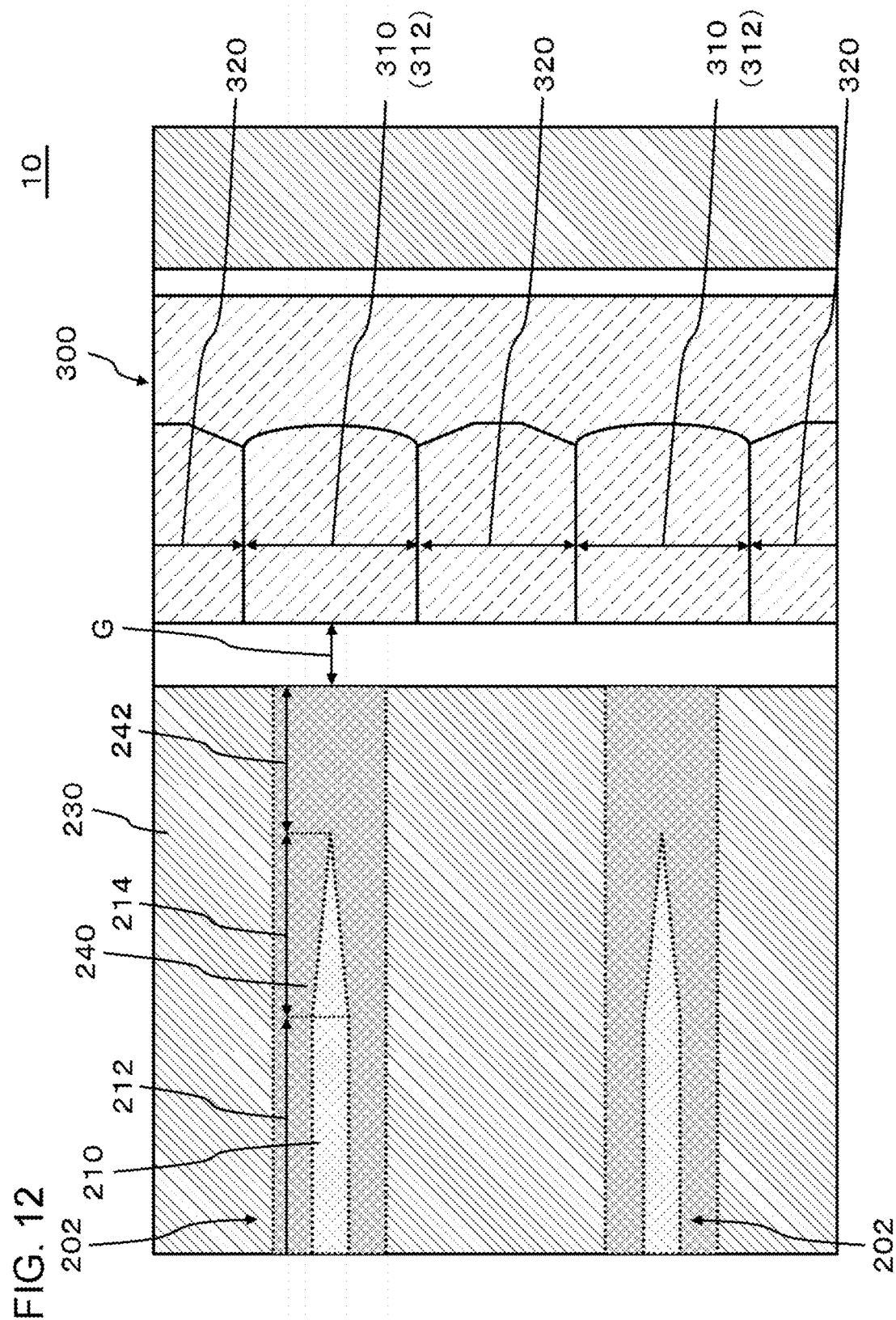
FIG. 12 is a view illustrating a modified example of FIG. 1.

FIG. 12 is a view illustrating a modified example of FIG. 1. In the example illustrated in the drawing, the optical circuit 10 includes a plurality of waveguides 202, and the optical member 300 extends throughout the plurality of waveguides 202. The optical member 300 includes a plurality of mirrors 312, and each of the plurality of mirrors 312 faces each of the plurality of waveguides 202. In the configuration, the optical I/O between the optical circuit 10 and the external element of the optical circuit 10 can be realized using the plurality of waveguides 202. Furthermore, since it is not necessary to dispose a plurality of optical members 300 to be apart from each other, the plurality of mirrors 312 can be disposed at high density.

Hereinabove, according to the present example embodiment, the optical circuit 10 is manufactured using the semiconductor manufacturing technology, and the optical I/O of which the optical coupling efficiency is largely independent of the wavelength and the polarized wave of the light is realized in the direction intersecting the surface (the first surface 102) of the substrate 100. Specifically, the first core 212 is formed of the semiconductor material. In other words, the first core 212 is formed using the semiconductor manufacturing technology. Furthermore, the light from the first core 212 is reflected by the mirror 312. Thus, according to the above configuration, the optical circuit 10 is manufactured using the semiconductor manufacturing technology, and the optical I/O of which the optical coupling efficiency is largely independent of the wavelength and the polarized wave of the light is realized in the direction intersecting the surface (first surface 102) of the substrate 100.

Second Example Embodiment

Figure 13:
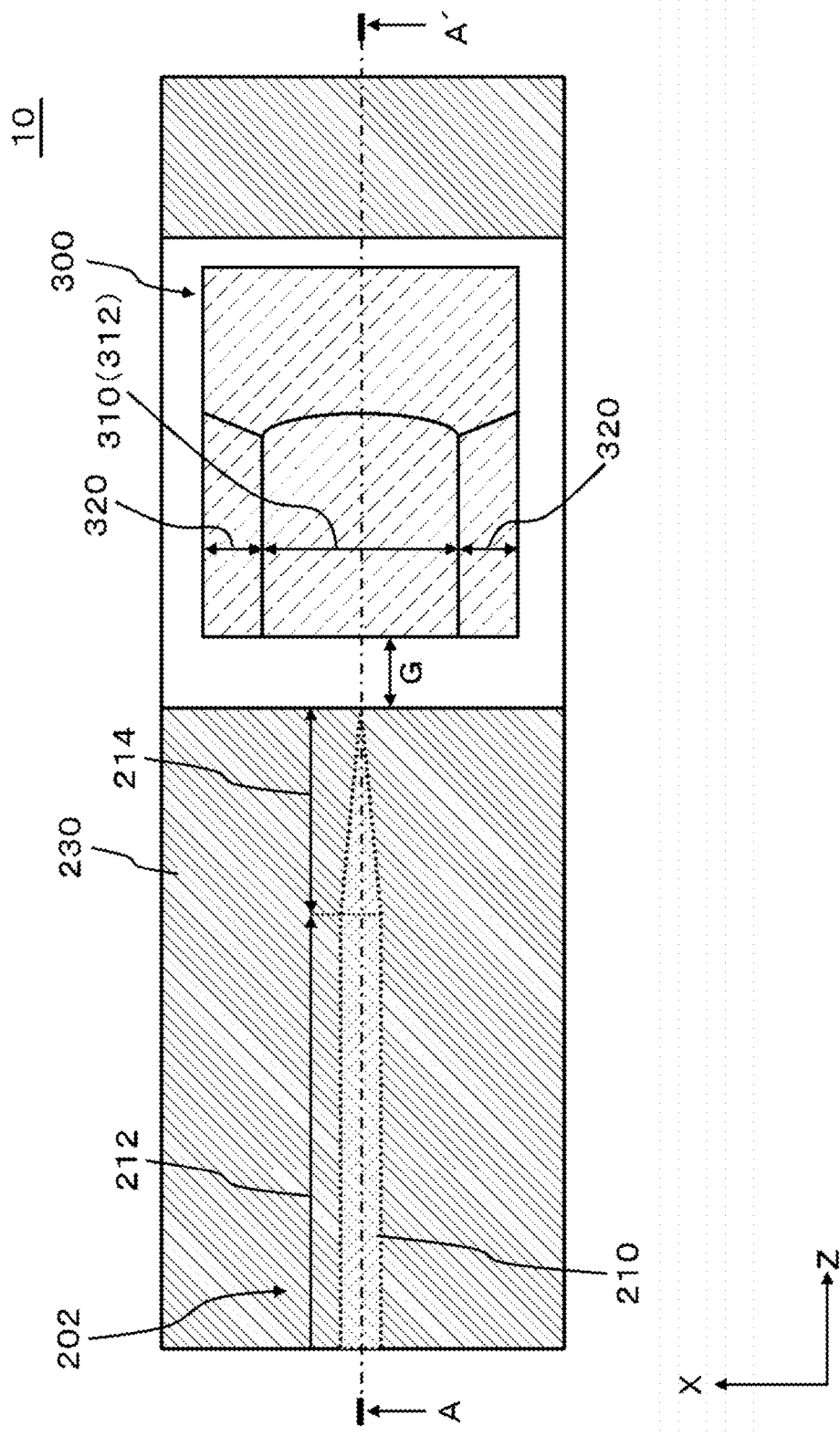
FIG. 13 is a plan view illustrating an optical circuit according to a second example embodiment.
Figure 14:
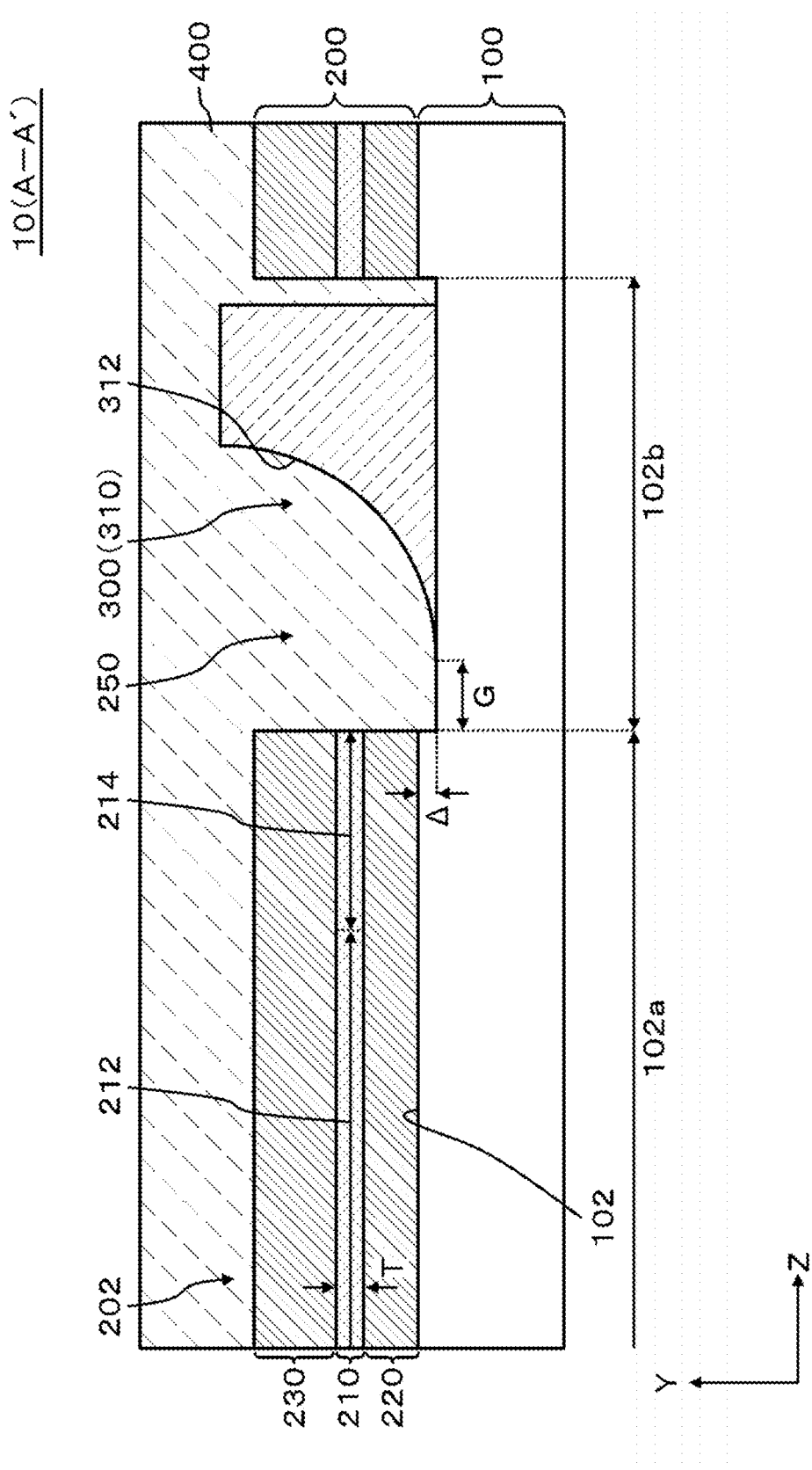
FIG. 14 is a cross-sectional view taken along A-A' of FIG. 13.

FIG. 13 is a plan view illustrating an optical circuit 10 according to a second example embodiment, and corresponds to FIG. 1 of the first example embodiment. FIG. 14 is a cross-sectional view taken along A-A' of FIG. 13, and corresponds to FIG. 2 of the first example embodiment. The optical circuit 10 according to the present example embodiment is the same as the optical circuit 10 according to the first example embodiment other than the following points.

The optical circuit 10 does not include the second core layer 240 (FIGS. 1 and 2), and thus the optical circuit 10 does not include the second core 242 (FIGS. 1 and 2). Specifically, the end of the waveguide 202 is an end of the SSC 214. When the light is emitted from the waveguide 202, the light is directly emitted to an outside of the waveguide 202 from the end of the SSC 214.

Also in the present example embodiment, the optical I/O is realized in the direction intersecting the surface (the first surface 102) of the substrate 100 using the semiconductor manufacturing technology. Specifically, the first core 212 is formed of the semiconductor material. In other words, the first core 212 is formed using the semiconductor manufacturing technology. Thus, according to the above configuration, the optical I/O is realized in the direction intersecting the surface (the first surface 102) of the substrate 100 using the semiconductor manufacturing technology.

In one example, the optical circuit 10 is formed using the silicon photonics. As a specific example using the silicon photonics, the first core 212 is formed of silicon. As a more specific example, the substrate 100 is the silicon substrate, the first core layer 210 is the silicon layer, the clad layer 220 is the silicon oxide layer ($SiO_2$ layer), and the clad layer 230 is the silicon oxide layer ($SiO_2$ layer). In the example, a thickness T of the first core 212 is thin and, in one example, is equal to or less than 500 nm. From a viewpoint that the light is propagated through the first core 212, it is preferable that the thickness T of the first core 212 is equal to or greater than 50 nm.

In another example, the optical circuit 10 may be formed using a technology different from the silicon photonics, specifically, a compound semiconductor laser technology. As a specific example of a case where the compound semiconductor laser technology is used, the first core layer 210 is formed of the compound semiconductor (for example, a GaAs-based semiconductor or a GaN-based semiconductor). In the example, the thickness T of the first core layer 210 is thin and, in one example, is equal to or less than 500 nm. From a viewpoint that the light is propagated through the first core 212, it is preferable that the thickness T of the first core 212 is equal to or greater than 50 nm.

Third Example Embodiment

Figure 15:
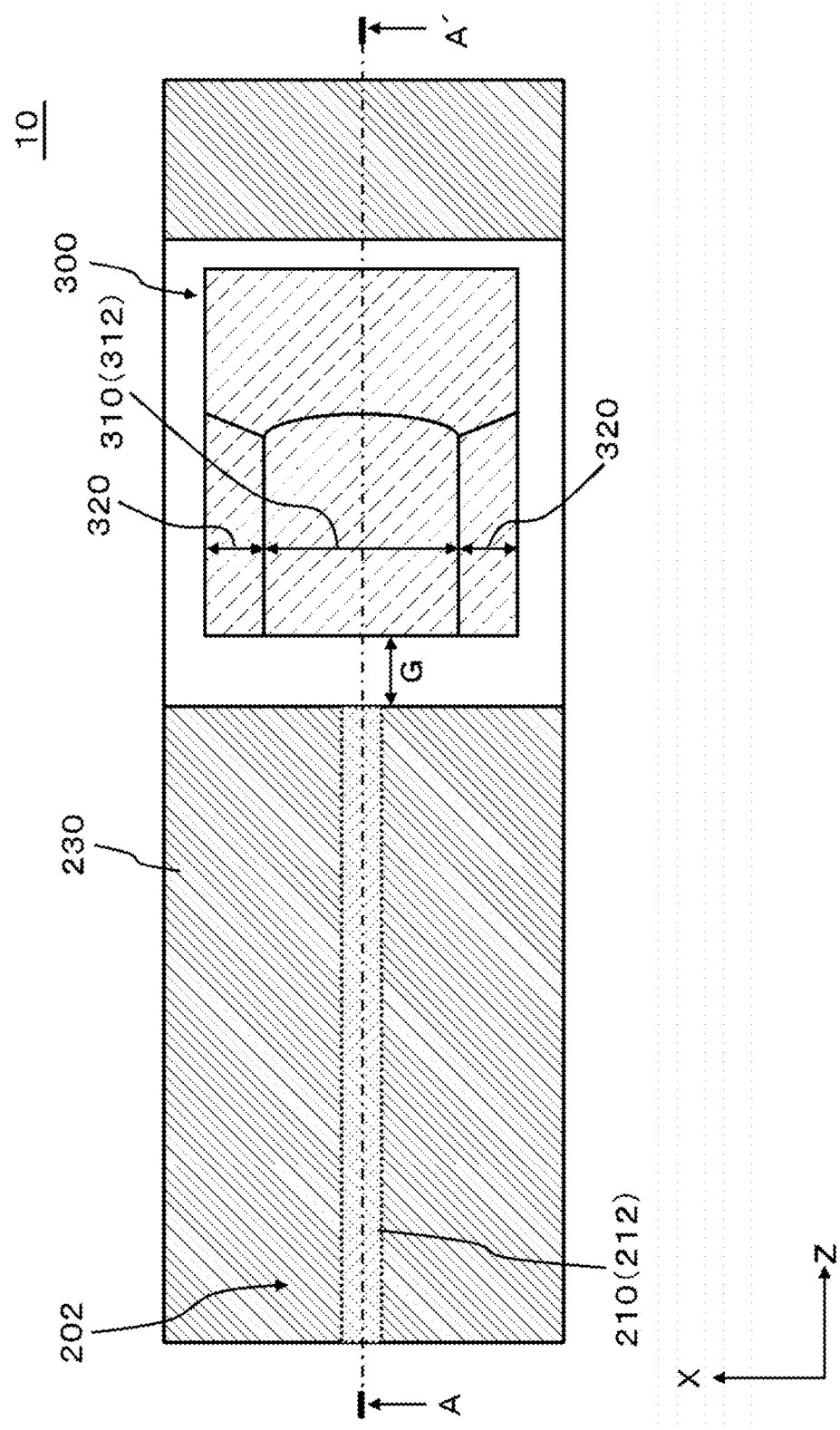
FIG. 15 is a plan view illustrating an optical circuit according to a third example embodiment.
Figure 16:
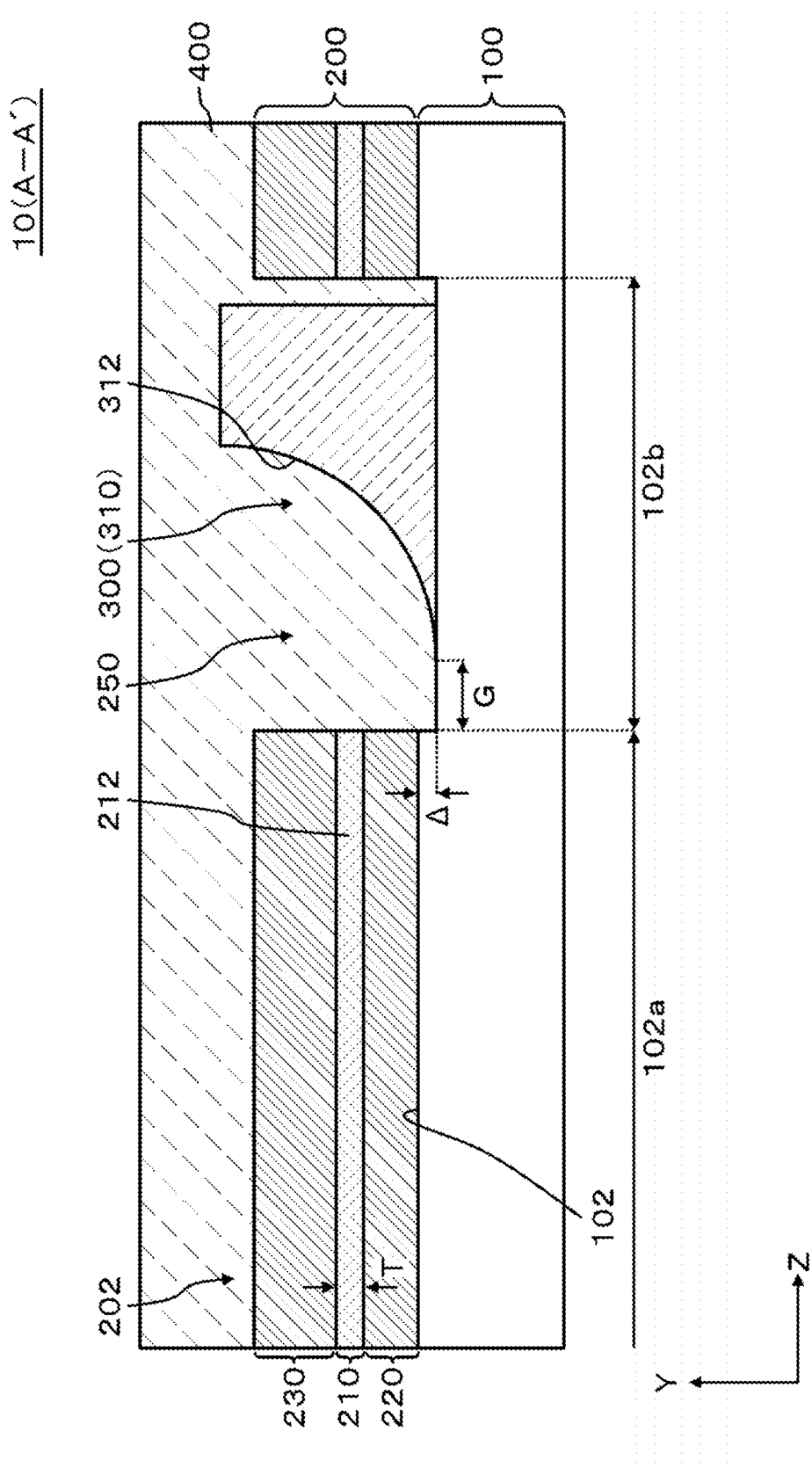
FIG. 16 is a cross-sectional view taken along A-A' of FIG. 15.

FIG. 15 is a plan view illustrating an optical circuit 10 according to a third example embodiment, and corresponds to FIG. 13 of the second example embodiment. FIG. 16 is a cross-sectional view taken along A-A' of FIG. 15, and corresponds to FIG. 14 of the second example embodiment. The optical circuit 10 according to the present example embodiment is the same as the optical circuit 10 according to the second example embodiment other than the following points.

The first core layer 210 does not include the SSC 214 (FIGS. 13 and 14). Specifically, the end of the waveguide 202 is an end of the first core 212. When light is emitted from the waveguide 202, the light is directly emitted to an outside of the waveguide 202 from the end of the first core 212.

When the cross-sectional area of the first core 212 is large to some extent, the divergence angle of the light emitted from the end of the waveguide 202 can be prevented from becoming large even if the SSC 214 (FIGS. 13 and 14) is not provided. Therefore, when the cross-sectional area of the first core 212 is large to some extent, the optical coupling efficiency can be high between the optical circuit 10 and the external element of the optical circuit 10 even if the SSC 214 (FIGS. 13 and 14) is not provided.

Fourth Example Embodiment

Figure 17:
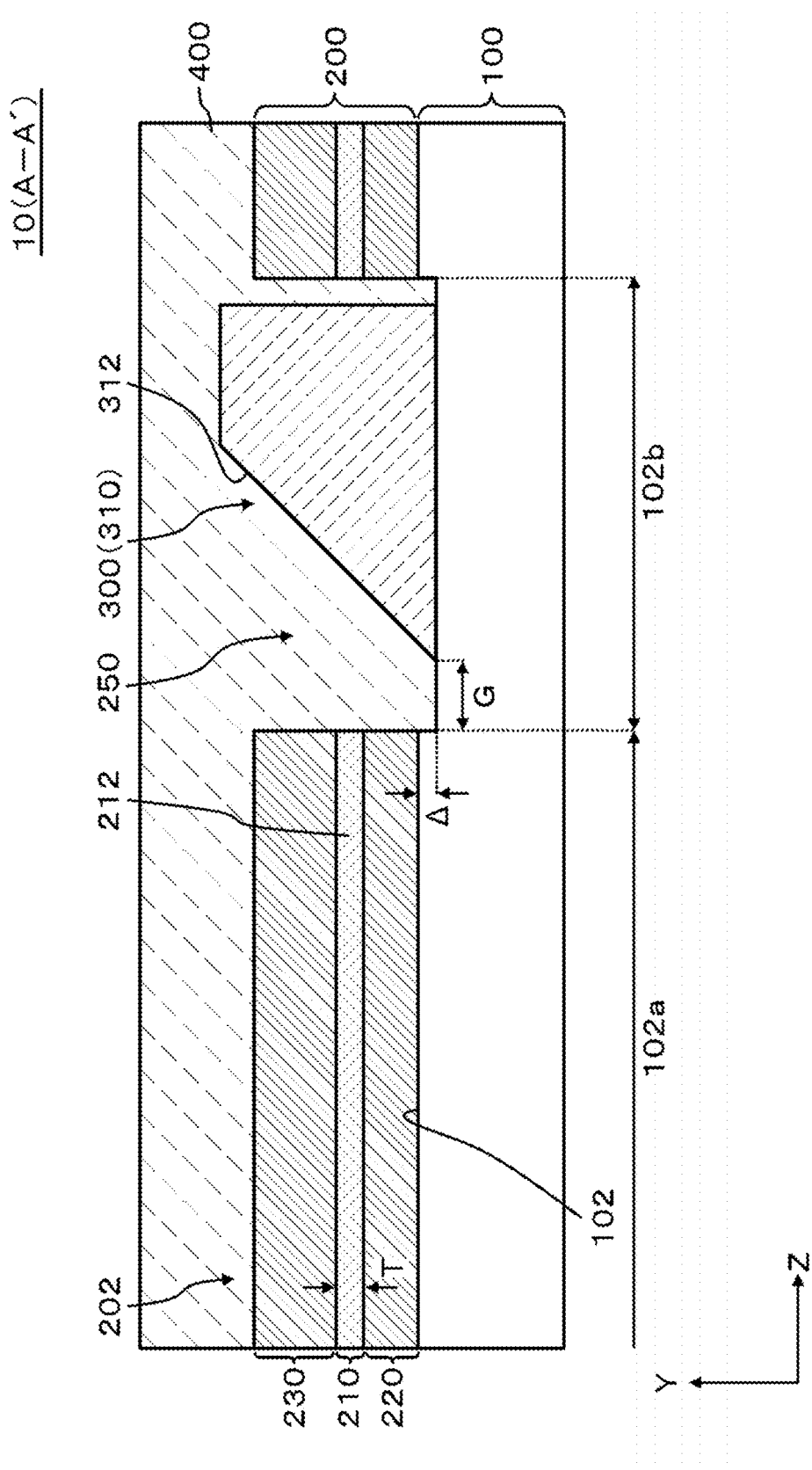
FIG. 17 is a cross-sectional view illustrating an optical circuit according to a fourth example embodiment.

FIG. 17 is a cross-sectional view illustrating an optical circuit 10 according to a fourth example embodiment, and corresponds to FIG. 16 of the third example embodiment. The optical circuit 10 according to the present example embodiment is the same as the optical circuit 10 according to the third example embodiment other than the following points.

The shape of the surface of the first portion 310 of the optical member 300 is plane, in other words, is not a curved surface.

Even if the shape of the surface of the first portion 310 is plane, the optical I/O in the direction intersecting the surface (the first surface 102) of the substrate 100 can be realized. Specifically, the surface of the first portion 310 (the mirror 312) of the optical member 300 faces obliquely upward relative to the first surface 102 of the substrate 100. Therefore, the light emitted from the waveguide 202 can be reflected toward above the first surface 102 of the substrate 100 by the mirror 312. Thus, even if the shape of the surface of the first portion 310 is plane, it is possible to realize the optical I/O in the direction intersecting the surface (the first surface 102) of the substrate 100.

EXAMPLE

FIGS. 18 to 21 are views illustrating simulation results of a mode field of the waveguide 202 of the optical circuit 10 illustrated in FIGS. 1 and 2. In FIGS. 18 to 21, simulations were performed using a Finite-Difference Time-Domain (FDTD).

Figure 18:
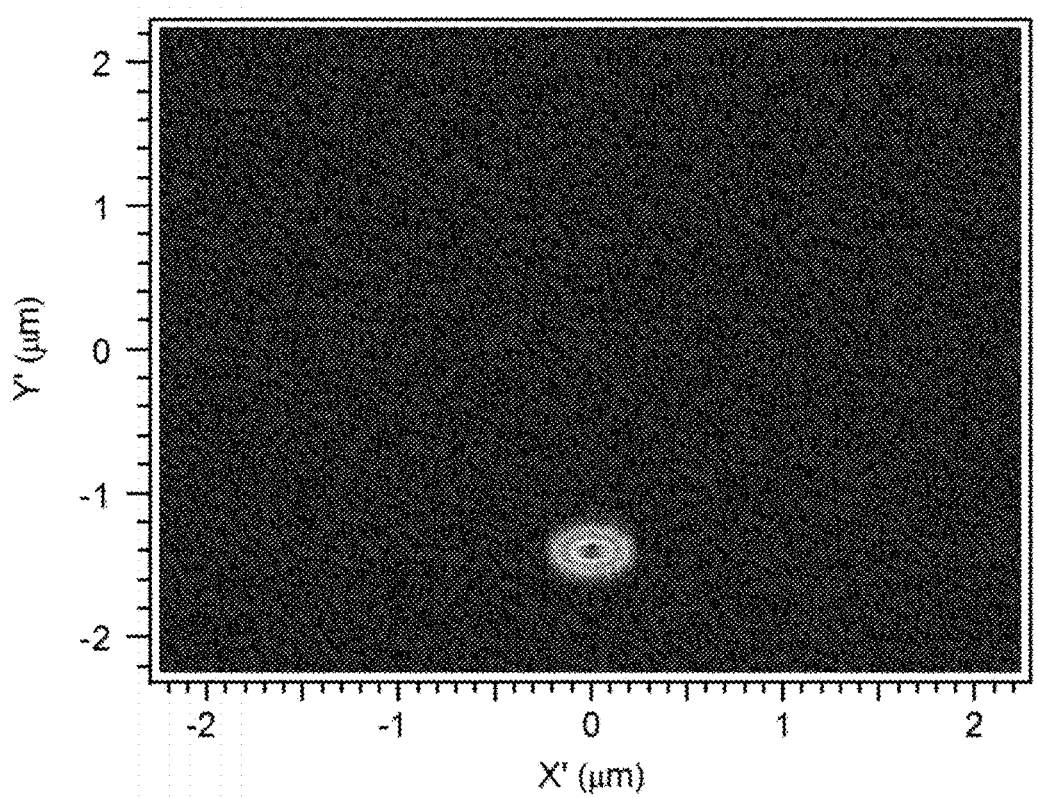
FIG. 18 is a view illustrating a simulation result of a mode field in a waveguide of the optical circuit illustrated in FIGS. 1 and 2.
Figure 19:
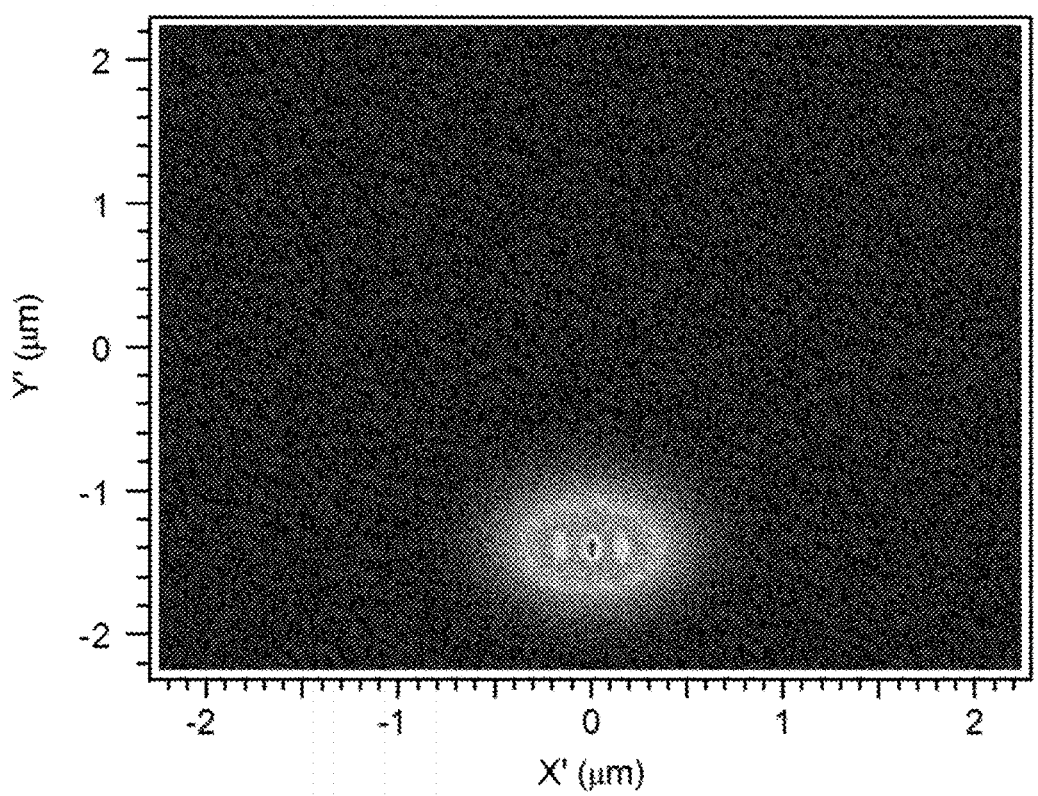
FIG. 19 is a view illustrating the simulation result of the mode field in the waveguide of the optical circuit illustrated in FIGS. 1 and 2.
Figure 20:
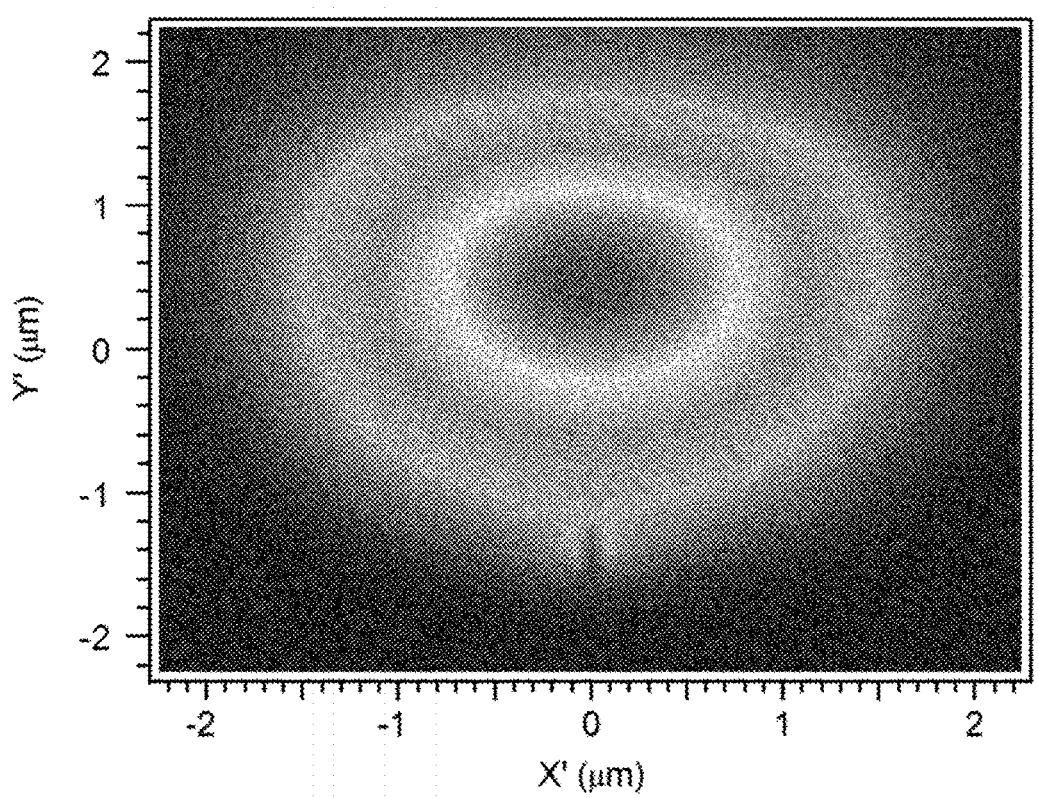
FIG. 20 is a view illustrating the simulation result of the mode field in the waveguide of the optical circuit illustrated in FIGS. 1 and 2.
Figure 21:
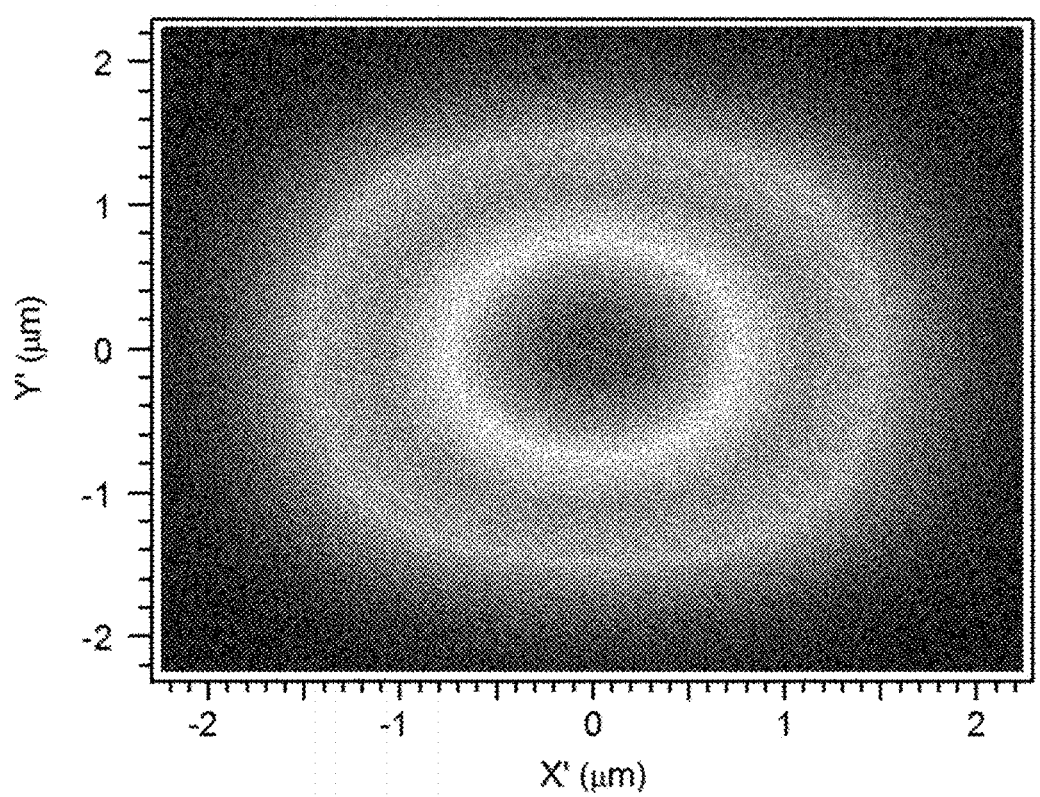
FIG. 21 is a view illustrating the simulation result of the mode field in the waveguide of the optical circuit illustrated in FIGS. 1 and 2.

FIG. 18 illustrates the mode field of an XY cross section of the first core 212. FIG. 19 illustrates the mode field of an XY cross section in an approximately middle of the SSC 214. FIG. 20 illustrates the mode field of the XY cross section at a boundary between the SSC 214 and the second core 242. FIG. 21 illustrates the mode field of the XY cross section of the second core 242.

In the simulations of FIGS. 18 to 21, the optical circuit 10 was as follows. The substrate 100 was the silicon substrate. The first core layer 210 was the silicon layer. The clad layer 220 was the silicon oxide layer ($SiO_2$ layer). The clad layer 230 was the silicon oxide layer ($SiO_2$ layer). The length of the SSC 214 was 100 μm.

Based on the simulation results of FIGS. 18 to 21, the spot size of the light could be enlarged by the SSC 214. Specifically, as illustrated in FIG. 18, the spot size in the first core 212 was approximately 0.5 μm. In contrast, as illustrated in FIG. 21, the spot size in the second core 242 was approximately 3 μm. Therefore, the spot size of the light could be enlarged by the SSC 214.

A conversion efficiency of the SSC 214 was approximately −0.64 dB.

Figure 22:
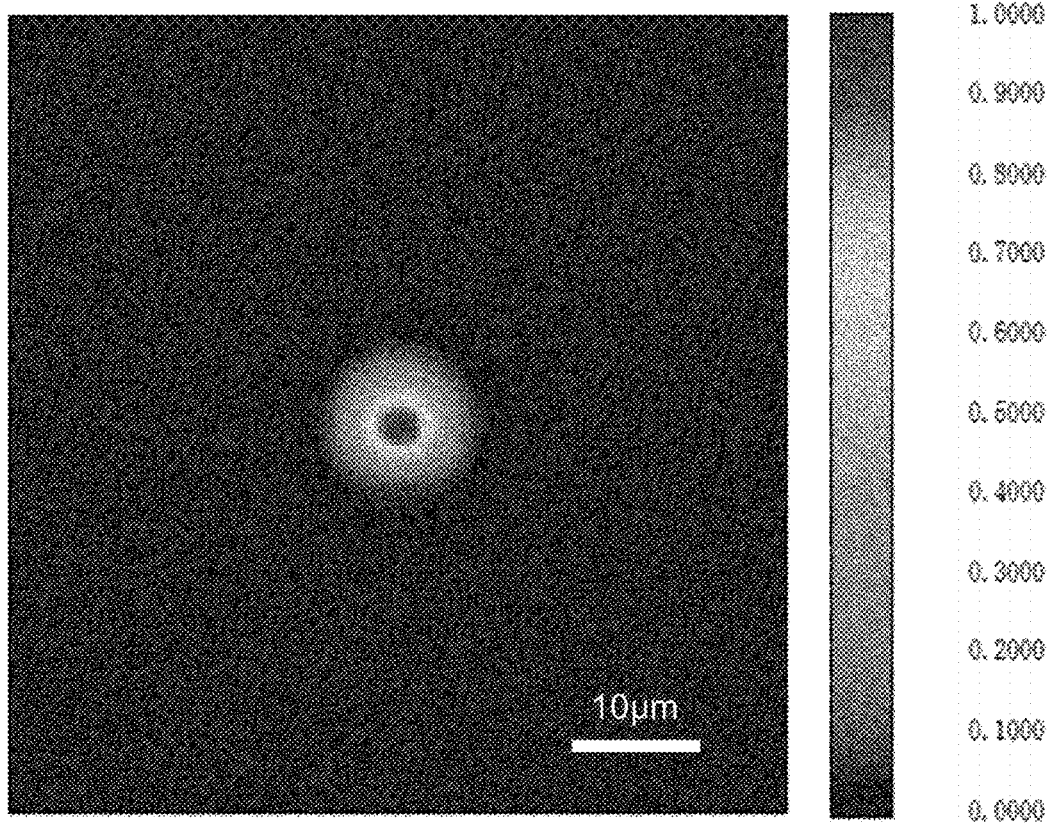
FIG. 22 is a view illustrating a simulation result of a shape of a beam reflected by an optical member of the optical circuit illustrated in FIGS. 1 and 2.

FIG. 22 is a view illustrating the simulation result of a shape of a beam reflected by the optical member 300 of the optical circuit 10 illustrated in FIGS. 1 and 2.

In the simulation of FIG. 22, a beam having a spot size of 3 μm was irradiated from a front side of the optical member 300 toward the mirror 312. A single mode fiber of a 10 μm was provided above the optical member 300. FIG. 22 illustrates the shape of the beam on a light reception surface of the single mode fiber.

As illustrated in FIG. 22, a good single mode beam was reflected from the mirror 312.

In the simulation of FIG. 22, the optical coupling efficiency was equal to or greater than 90%.

Based on the simulation results of FIGS. 18 to 21 and the simulation result of FIG. 22, the spot size can be enlarged from approximately 0.5 μm to approximately 10 μm by both the SSC 214 and the mirror 312. Specifically, as can be seen from the simulation results of FIGS. 18 to 21, the spot size was enlarged from approximately 0.5 μm (FIG. 18) to approximately 3 μm (FIG. 21) by the SSC 214. Furthermore, as can be seen from the simulation result of FIG. 22, the spot size was enlarged from 3μ to approximately 10 μm by the mirror 312. From the results, the spot size can be enlarged from approximately 0.5 μm to approximately 10 μm by both the SSC 214 and the mirror 312.

Furthermore, based on the simulation results of FIGS. 18 to 21 and the simulation result of FIG. 22, the spot size can be enlarged from approximately 0.5 μm to approximately 10 μm by a small element. Specifically, the length of the SSC 214 used for the simulations of FIGS. 18 to 21 was 100 μm. A length of the mirror 312 used for the simulation of FIG. 22 (a length along an extension direction of the waveguide 202) was 50 μm. From the results, the spot size can be enlarged from approximately 0.5 μm to approximately 10 μm by an element having a length of 150 μm.

Figure 23:
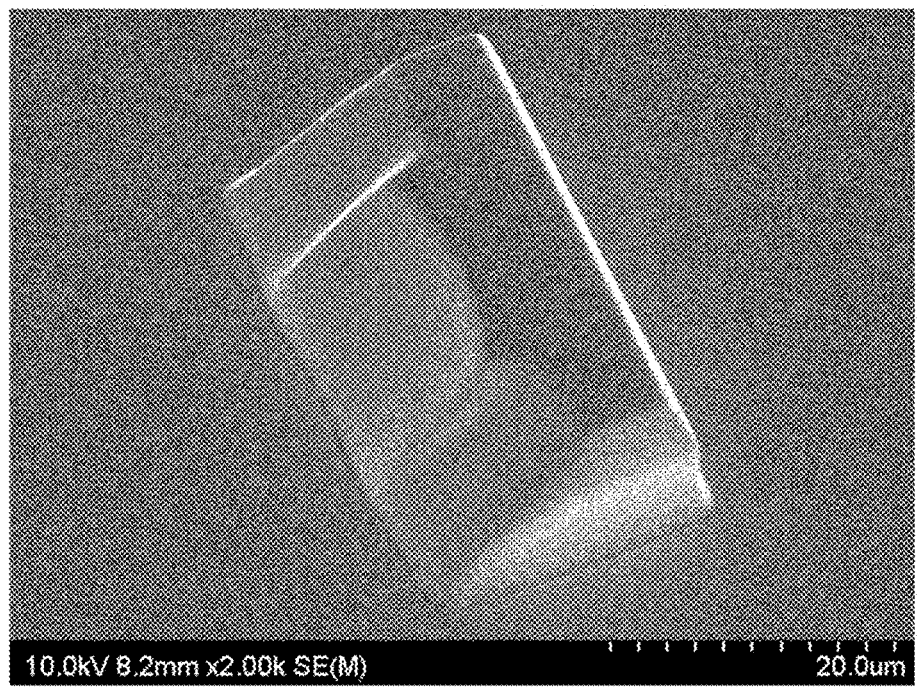
FIG. 23 is a view illustrating one example of an electron microscopy image of the optical member illustrated in FIGS. 1 and 2.

FIG. 23 is a view illustrating one example of an electron microscopy image of the optical member 300 illustrated in FIGS. 1 and 2. In the example, similar to the examples illustrated in FIGS. 1 and 2, the optical member 300 includes a region corresponding to the first portion 310, and regions corresponding to the second portions 320.

FIGS. 24 and 25 are views illustrating properties of the spot size conversion by the optical member 300 illustrated in FIG. 23. FIG. 24 illustrates a Near Field Pattern (NFP) and a Far Field Pattern (FFP) of the light irradiated to the mirror 312 of the optical member 300. FIG. 25 illustrates the NFP and the FFP of the light reflected by the mirror 312 of the optical member 300.

As illustrated in FIG. 24, the beam having a spot size of 3 μm and a divergence angle of 38° was irradiated from the front side of the optical member 300 toward the mirror 312.

As illustrated in FIG. 25, the spot size of the light reflected by the mirror 312 of the optical member 300 was approximately 10 μm. Furthermore, as illustrated in FIG. 25, the divergence angle of the light reflected by the mirror 312 of the optical member 300 was approximately 16°.

Based on the results illustrated in FIGS. 24 and 25, the spot size of the beam can be enlarged from 3 μm (FIG. 24) to approximately 10 μm (FIG. 25) by the optical member 300 and to reduce the divergence angle of the beam from 38° (FIG. 24) to approximately 16° (FIG. 25).

Figure 26:
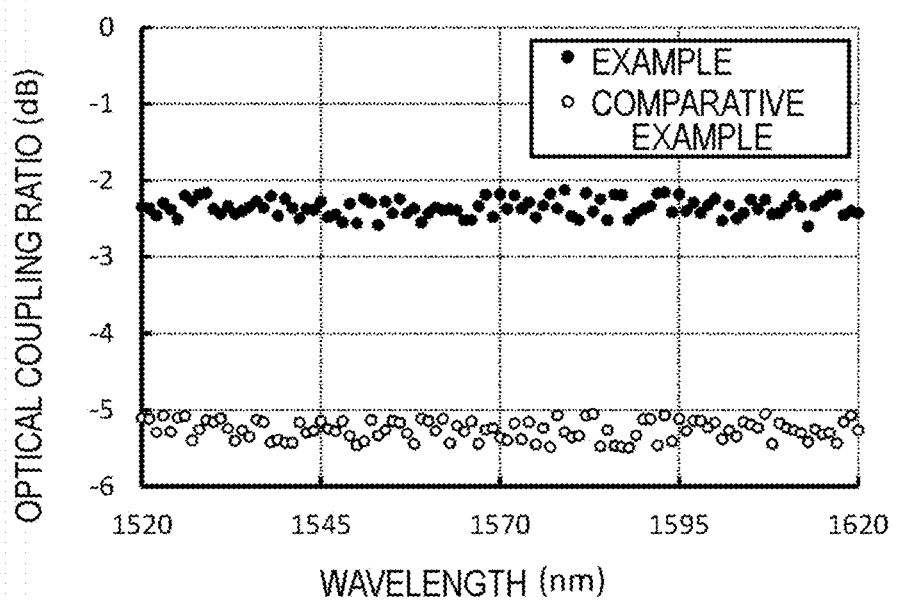
FIG. 26 illustrates a measurement result of an optical coupling efficiency when the beam is input to a single mode fiber using the optical member illustrated in FIG. 23 (example) and a measurement result of the optical coupling efficiency when the beam is input to the single mode fiber without using the optical member (comparative example).

FIG. 26 illustrates a measurement result of the optical coupling efficiency when the beam is input to the single mode fiber using the optical member 300 illustrated in FIG. 23 (example) and a measurement result of the optical coupling efficiency when the beam is input to the single mode fiber without using the optical member 300 (comparative example).

In the example of FIG. 26, the beam having a spot size of 3 μm was irradiated from the front side of the optical member 300 toward the mirror 312. Furthermore, the single mode fiber was provided above the optical member 300. The beam reflected by the mirror 312 is input to the single mode fiber.

In the comparative example of FIG. 26, the beam having a spot size of 3 μm was irradiated from a front side of the single mode fiber while the optical member 300 was not provided. The beam is directly input to the single mode fiber without being reflected by the optical member 300.

As illustrated in FIG. 26, the optical coupling efficiency of the example was higher than the optical coupling efficiency of the comparative example by 3 dB, in other words, the optical coupling efficiency of the example was approximately double of the optical coupling efficiency of the comparative example. The result may be caused by the spot size conversion by the mirror 312.

(Various Parameters of Optical Device)

Figure 27:
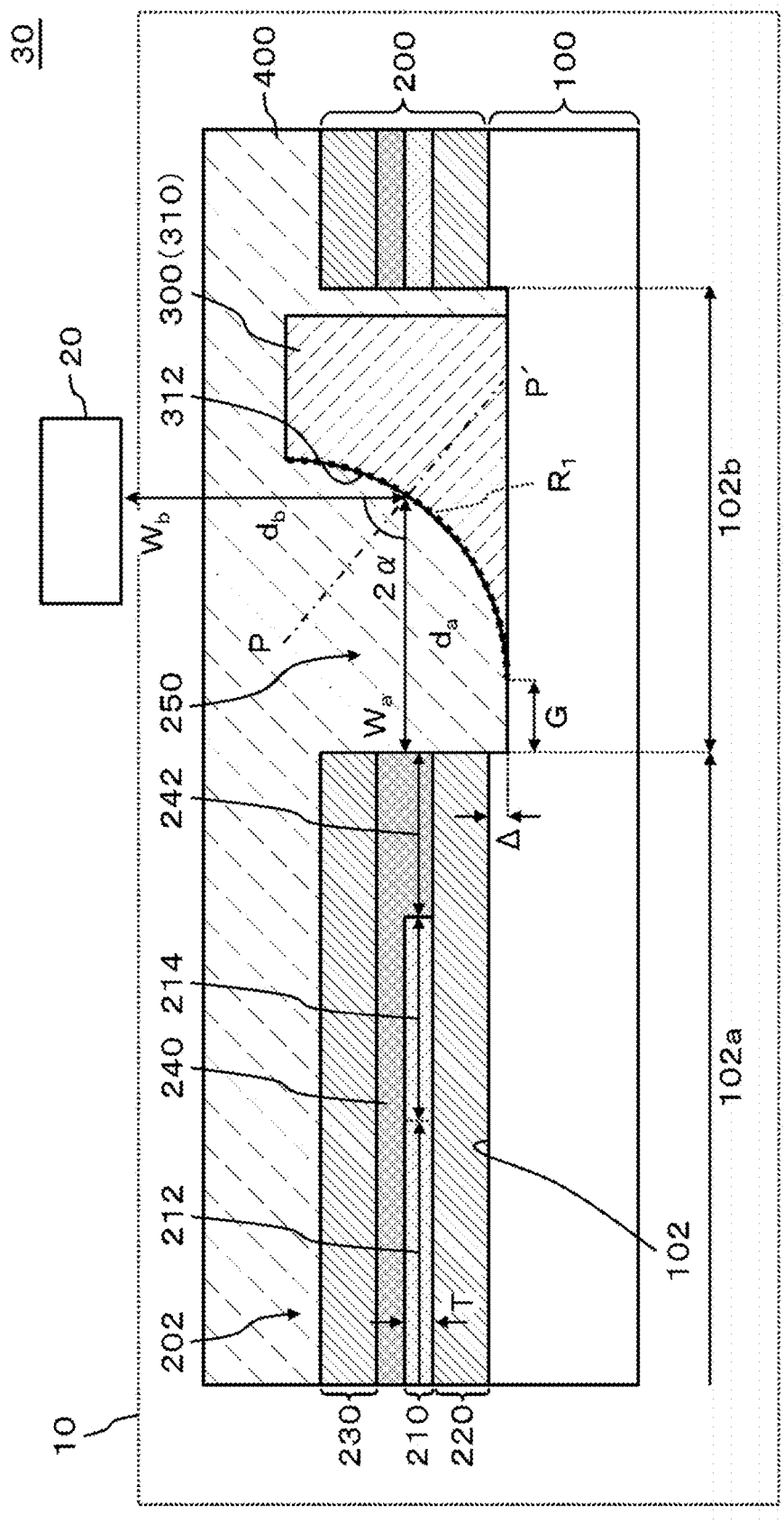
FIG. 27 is a view illustrating various parameters of the optical device illustrated in FIG. 3.
Figure 28:
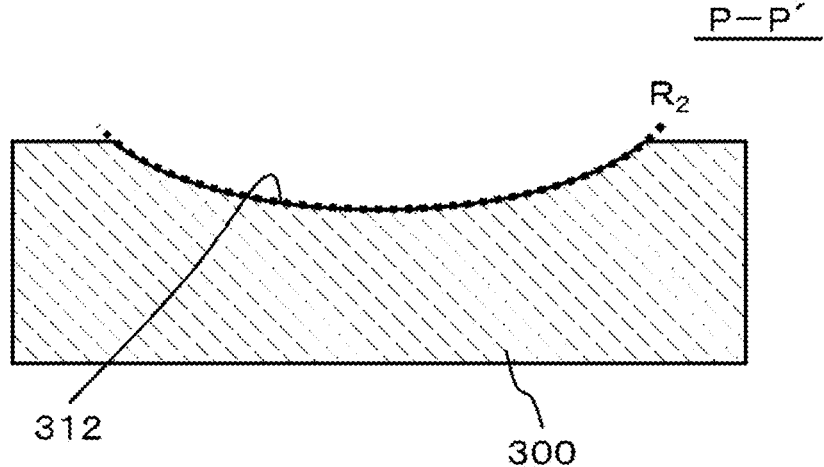
FIG. 28 is a view illustrating the various parameters of the optical device illustrated in FIG. 3.

FIGS. 27 and 28 are views illustrating various parameters of the optical device 30 illustrated in FIG. 3. A P-P' of FIG. 27 indicates a normal line of a surface at a center of the mirror 312, and FIG. 28 illustrates a cross section taken along the P-P'. The surface of the mirror 312 in the cross section illustrated in FIG. 27 is curved at a radius of curvature $R_1$, the surface of the mirror 312 in the cross section illustrated in FIG. 28 is curved at a radius of curvature $R_2$, and the end of the waveguide 202 and the surface of the mirror 312 are spaced apart from each other at a distance $d_a$.

In one example, the radius of curvature $R_1$, the radius of curvature $R_2$, and the distance $d_a$ may be represented as the following Equations (A), (B), and (C), respectively. In the example, the optical coupling efficiency can be high between the optical circuit 10 and the element 20. Deduction of Equations (A), (B), and (C) will be described later.

[MATH 1]

$$d_a = \sqrt{\left(\frac{\pi W_a^2}{4\lambda_{eff}}\right)^2\left(\left(\frac{W_b}{W_a}\right)^2 - 1\right) + d_b^2\left(\frac{W_a}{W_b}\right)^2} \quad (A)$$

[MATH 2]

$$R_1 = \frac{2}{\cos\alpha} \cdot \frac{W_a^2 \cdot W_b^2}{W_a^2 \cdot d_b + W_b^2 \cdot d_a} \cdot \left(\left(\frac{\pi W_a}{4\lambda_{eff}}\right)^2 + \left(\frac{d_a}{W_a}\right)^2\right) \quad (B)$$

[MATH 3]

$$R_2 = R_1(\cos\alpha)^2 \quad (C)$$

$W_a$: a spot size of the waveguide 202
$W_b$: a spot size of the element 20
$d_b$: distance between the surface of the element 20 and the surface of the mirror 312 (If a region of media having a reflective index different from that of the sealing layer 400 is located between the surface of the element 20 and the surface of the mirror 312, an optical distance of the region is converted into an optical distance of the sealing layer 400.)
$\mu_{eff}$: a wavelength of the light in the middle of the sealing layer 400
$2\alpha$: an angle between an optical axis of the beam propagated between the end of the waveguide 202 and the surface of the mirror 312 and an optical axis of the beam propagated between the surface of the element 20 and the surface of the mirror 312.

When the optical device 30 satisfies Equations (A), (B), and (C), and the spot sizes $W_a$ and $W_b$, the wavelength $\lambda_{eff}$, and the distance $d_b$ are 1 μm<$W_a$<5 μm, 3 μm<$W_b$<15 μm, 0.6 μm<$\lambda_{eff}$<1.8 μm, and 0<$d_b$<150 μm, the radiuses of curvature $R_1$ and $R_2$ and the distance $d_a$ are in a range of 3.0 μm<$R_1$<300.0 μm, 1.5 μm<$R_2$<150.0 μm, and 1.0 μm<$d_a$<100.0 μm. In other words, when the spot sizes $W_a$ and $W_b$, the wavelength $\lambda_{eff}$, the distances $d_a$ and $d_b$, and the radiuses of curvature $R_1$ and $R_2$ are 1 μm<$W_a$<5 μm, 3 μm<$W_b$<15 μm, 0.6 μm<$\lambda_{eff}$<1.8 μm, 1.0 μm<$d_a$<100.0 μm, 0<$d_b$<150 μm, 3.0 μm<$R_1$<300.0 μm, and 1.5 μm<$R_2$<150.0 μm, the optical coupling efficiency between the optical circuit 10 and the element 20 is high.

Figure 29:
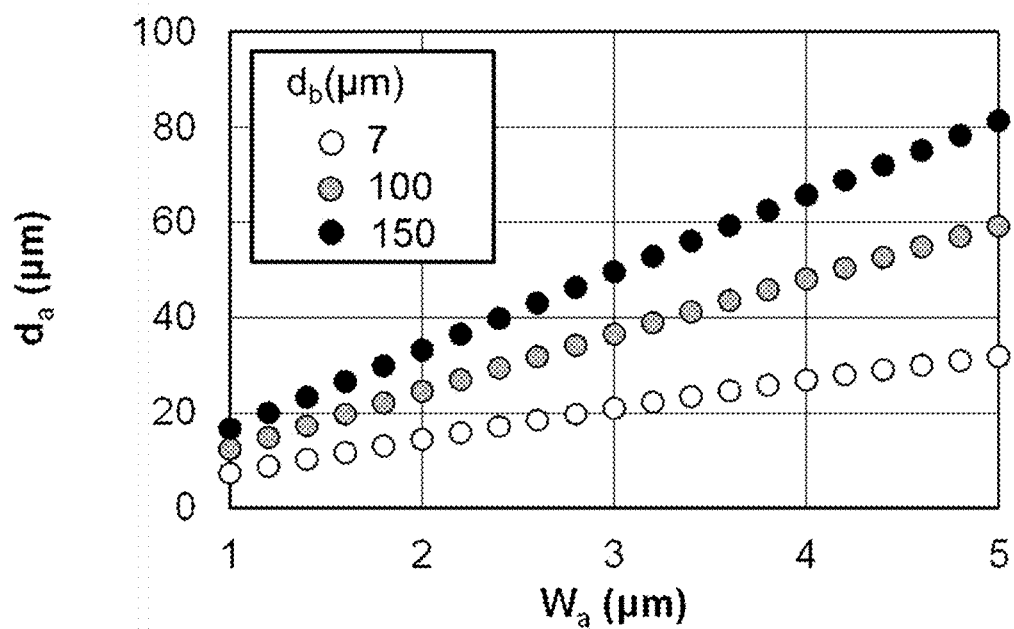
FIG. 29 is a graph illustrating one example of a relationship between a spot size $W_a$ and a distance $d_a$ when the optical device satisfies Equations (A), (B), and (C).

FIG. 29 is a graph illustrating a relationship between the spot size $W_a$ and the distance $d_a$ when the optical device 30 satisfies Equations (A), (B), and (C). The graph illustrated in FIG. 29 illustrates a relationship with the distance $d_b$ of 7

μm, a relationship with the distance $d_b$ of 100 μm, and a relationship with the distance $d_b$ of 150 μm. In FIG. 29, the spot size $W_b$ of the element 20 is 10 μm and an angle 2α is 90° (α=45°).

Figure 30:
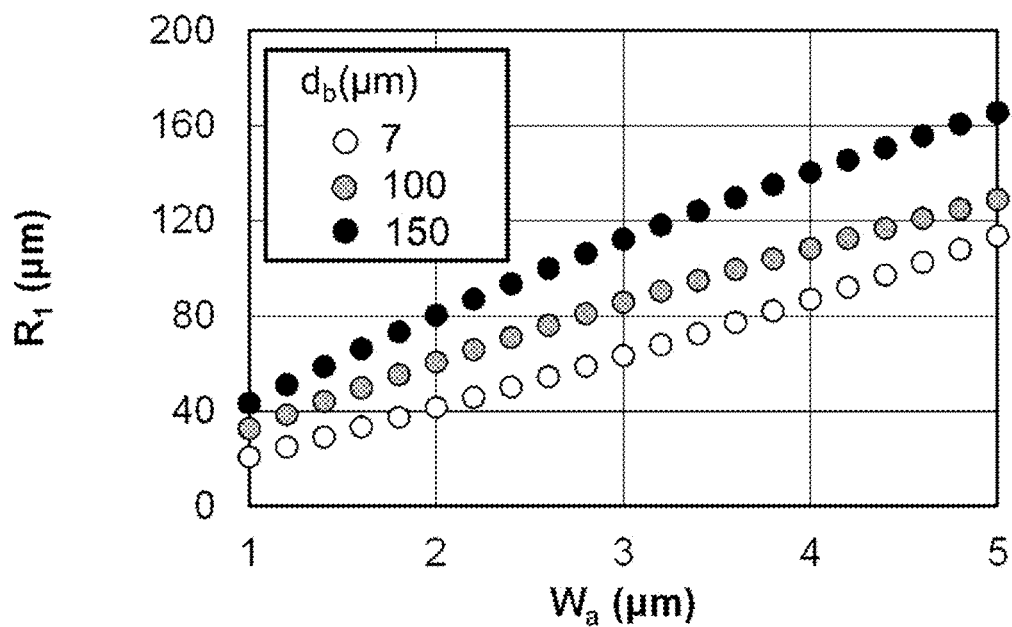
FIG. 30 is a graph illustrating one example of a relationship between the spot size $W_a$ and a radius of curvature $R_1$ when the optical device satisfies Equations (A), (B), and (C).

FIG. 30 is a graph illustrating one example of a relationship between the spot size $W_a$ and the radius of curvature $R_1$ when the optical device 30 satisfies Equations (A), (B), and (C). The graph illustrated in FIG. 30 illustrates the relationship with the distance $d_b$ of 7 μm, the relationship with the distance $d_b$ of 100 μm, and the relationship with the distance $d_b$ of 150 μm. In FIG. 30, the spot size $W_b$ of the element 20 is 10 μm and the angle 2α is 90° (α=45°).

Figure 31:
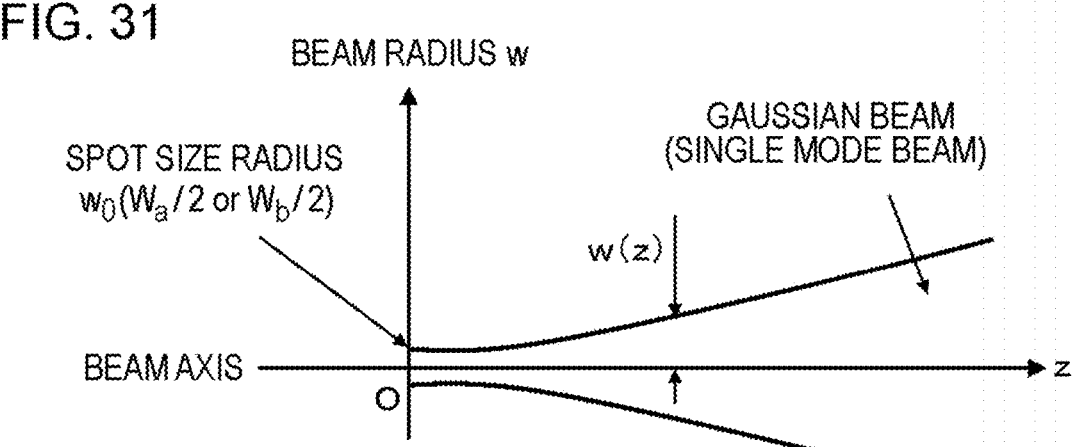
FIG. 31 is a view illustrating a method of deducting Equations (A), (B), and (C).
Figure 32:
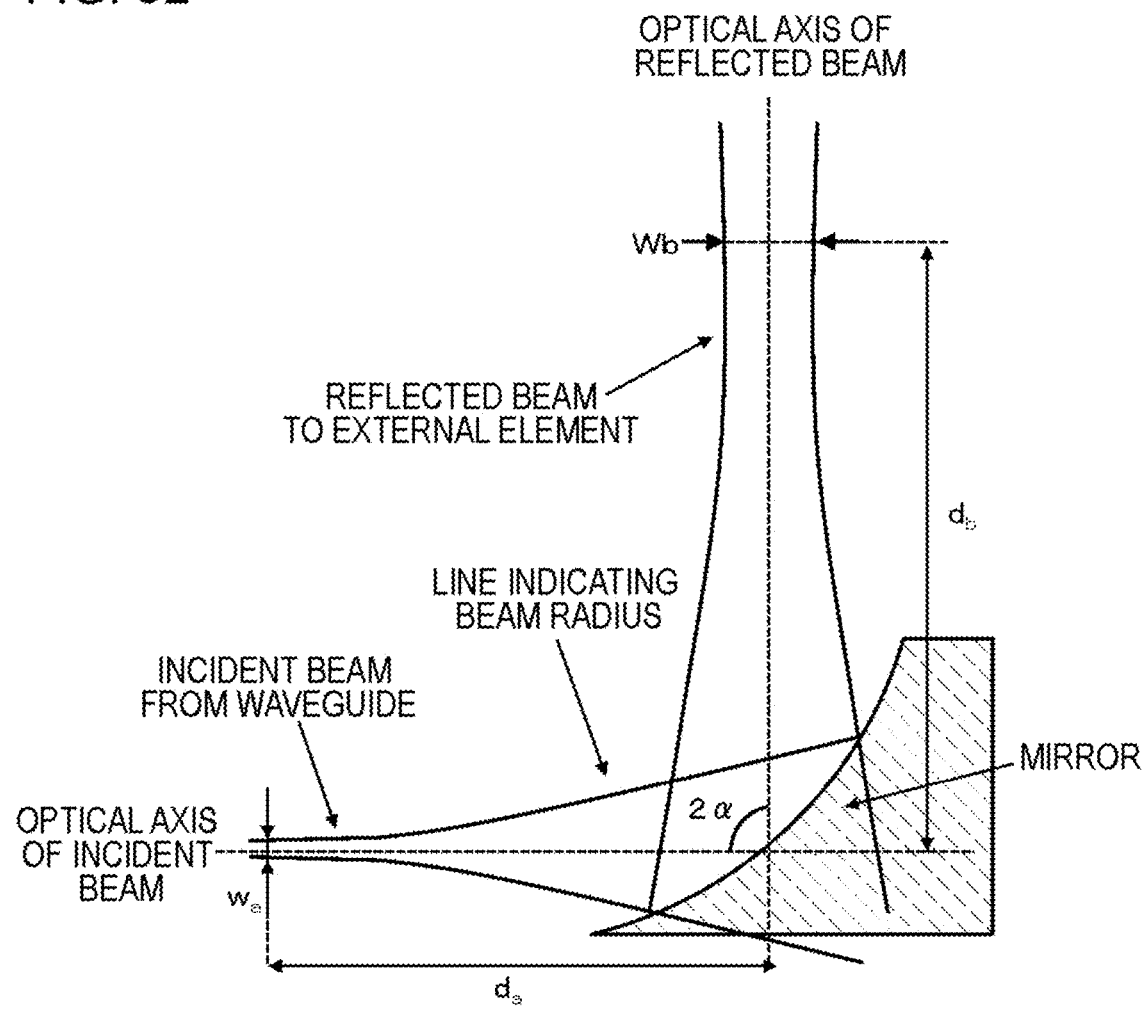
FIG. 32 is a view illustrating the method of deducting Equations (A), (B), and (C).
Figure 33:
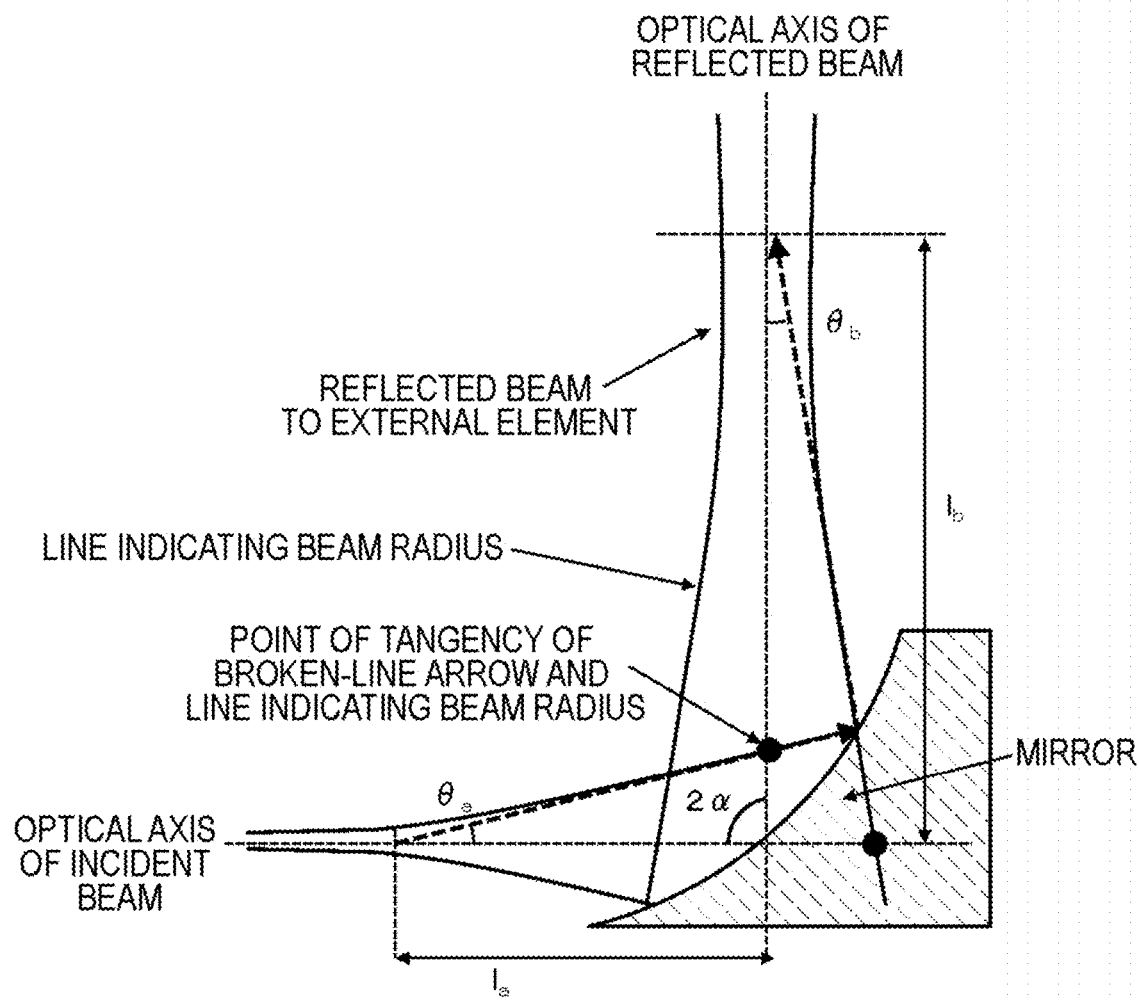
FIG. 33 is a view illustrating the method of deducting Equations (A), (B), and (C).

FIGS. 31 to 33 are views illustrating a method of deducting Equations (A), (B), and (C). Equations (A), (B), and (C) are deducted as follows.

The light propagated between the end of the waveguide 202 and the surface of the mirror 312, and the light propagated between the surface of the element 20 and the surface of the mirror 312, are treated as Gaussian beams illustrated in FIG. 31. The Gaussian beams comply with the following Equation (1).

[MATH 4]

$$w(z)^2 = w_0^2 \left(1 + \left(\frac{\lambda_{\text{eff}} z}{\pi w_0^2}\right)^2\right) \quad (1)$$

Assume that the light emitted from the end of the waveguide 202 is reflected by the mirror 312 as illustrated in FIG. 32. In this case, assume that a beam size of an incident beam at the mirror 312 and a beam size of a reflected beam at the mirror 312 is equivalent to each other. In this case, from Equation (1):

[MATH 5]

$$w_{0a}^2 \left(1 + \left(\frac{\lambda_{\text{eff}}}{\pi w_{0a}^2}\right)^2 d_a^2\right) = w_{0b}^2 \left(1 + \left(\frac{\lambda_{\text{eff}}}{\pi w_{0b}^2}\right)^2 d_b^2\right) \quad (2)$$

where:

[MATH 6]

$$w_{0a} = \frac{W_a}{2}, \; w_{0b} = \frac{W_b}{2} \quad (3)$$

By substituting Equation (3) for Equation (2) to solve the $d_a$:

[MATH 7]

$$d_a = \sqrt{\left(\frac{\pi W_a^2}{4\lambda_{\text{eff}}}\right)^2 \left(\left(\frac{W_b}{W_a}\right)^2 - 1\right) + d_b^2 \left(\frac{W_a}{W_b}\right)^2} \quad (4)$$

Equation (4) is the same as Equation (A). Thus, Equation (A) is deducted.

Next, as illustrated using broken-line arrows in FIG. 33, the Gaussian beam is approximated to a linear beam. An inclination of the incident beam and an inclination of the reflected beam are respectively a value differentiated with respect to z at z=$d_a$ of FIG. 32 and a value differentiated with respect to z at z=$d_b$ of FIG. 32. With reference to Japanese Unexamined Patent Publication No. 2009-265275, for example, the radius of curvature $R_1$ of the mirror 312 is expressed as in the following Equation (5) based on geometric optics.

[MATH 8]

$$R_1 = \frac{2}{\cos\alpha} \cdot \frac{l_a l_b}{l_a + l_b} \quad (5)$$

A length $l_a$ is expressed as in the following Equation (6) based on an inclined angle $\theta_a$ of the incident beam and a beam radius $w_m$ of the Gaussian beam at the surface of the mirror 312.

[MATH 9]

$$l_a = \frac{w_m}{\tan\theta_a} \quad (6)$$

From Equation (1), the beam radius $w_m$ is:

[MATH 10]

$$w_m = w_{0a} \sqrt{1 + \left(\frac{\lambda_{\text{eff}}}{\pi w_{0a}^2}\right)^2 d_a^2} \quad (7)$$

Since the inclination of the incident beam is a value for the differential of a radius of the incident beam with respect to z at z=$d_a$ in FIG. 32, tan $\theta_a$ is:

[MATH 11]

$$\tan\theta_a = \frac{d}{dz} w(d_a) = \left(\frac{\lambda_{\text{eff}}}{\pi w_{0a}}\right) \cdot \frac{d_a}{w_m} \quad (8)$$

Equations (6) to (8) are established in the same manner for a length $l_b$. By substituting these equations for Equation (5):

[MATH 12]

$$R_1 = \frac{2}{\cos\alpha} \cdot \frac{w_{0a}^2 \cdot w_{0b}^2}{w_{0a}^2 \cdot d_b + w_{0b}^2 \cdot d_a} \cdot \left(\left(\frac{\pi w_{0a}}{\lambda_{\text{eff}}}\right)^2 + \left(\frac{d_a}{w_{0a}}\right)^2\right) = \frac{2}{\cos\alpha} \cdot \frac{W_a^2 \cdot W_b^2}{W_a^2 \cdot d_b + W_b^2 \cdot d_a} \cdot \left(\left(\frac{\pi W_a}{4\lambda_{\text{eff}}}\right)^2 + \left(\frac{d_a}{W_a}\right)^2\right) \quad (9)$$

With reference to Japanese Unexamined Patent Publication No. 2009-265275, based on the geometric optics, the radius of curvature $R_2$ is:

[MATH 13]

$$R_2 = R_1 (\cos \alpha)^2 \quad (10)$$

Equation (9) is the same as Equation (B), and Equation (10) is the same as Equation (C). Thus, Equations (B) and (C) are deducted.

Hereinabove, although the example embodiments of present invention are described with reference to the accompanying drawings, the example embodiments are only examples of the present invention, and it is possible to use various configurations other than the above example embodiments.

This application claims priority based on Japanese Patent Application No. 2016-215055 filed Nov. 2, 2016, and the content of the application is incorporated herein by reference in its entirety.

The invention claimed is:

1. An optical circuit comprising:
   a substrate comprising a first surface;
   a waveguide over the first surface of the substrate, the waveguide comprising a first core formed of a semiconductor material; and
   a concave mirror reflecting light emitted from the waveguide in a direction away from the first surface of the substrate, the concave mirror comprising a resin made of a photosensitive resin, and reflection layer coating at least a portion of a surface of the resin,
   wherein the waveguide comprises a spot size converter enlarging a spot size of light propagated from the first core to the concave mirror.

2. The optical circuit according to claim 1,
   wherein the first surface of the substrate comprises a first region and a second region,
   wherein the waveguide is located over the first region of the first surface,
   wherein the concave mirror is located over the second region of the first surface, and
   wherein the second region of the first surface is located lower than the first region of the first surface.

3. The optical circuit according to claim 1,
   wherein the semiconductor material is silicon.

4. The optical circuit according to claim 3,
   wherein a thickness of the first core is equal to or less than 500 nm.

5. The optical circuit according to claim 1,
   wherein the semiconductor material is a compound semiconductor.

6. The optical circuit according to claim 5,
   wherein a thickness of the first core is equal to or less than 500 nm.

7. An optical device comprising:
   an optical circuit; and
   an element outside the optical circuit,
   wherein the optical circuit comprises:
   a substrate comprising a first surface;
   a waveguide over the first surface of the substrate, the waveguide comprising a first core formed of a semiconductor material; and
   a concave mirror reflecting light emitted from the waveguide in a direction away from the first surface of the substrate, the concave mirror comprising a resin made of a photosensitive resin, and reflection layer coating at least a portion of a surface of the resin,
   wherein the waveguide comprises a spot size converter enlarging a spot size of light propagated from the first core to the concave mirror,
   wherein the light reflected by the mirror is input to the element.

* * * * *

UNITED STATES PATENT AND TRADEMARK OFFICE
CERTIFICATE OF CORRECTION

PATENT NO. : 10,830,951 B2  
APPLICATION NO. : 16/343998  
DATED : November 10, 2020  
INVENTOR(S) : Akihiro Noriki et al.

Page 1 of 1

It is certified that error appears in the above-identified patent and that said Letters Patent is hereby corrected as shown below:

On the Title Page

Item (73) Assignee:
Delete "National Institute of Advanced Industrial Science and Technology, Tokyo (JP)" and insert
-- National Institute of Advanced Industrial Science and Technology, Tokyo (JP) and Photonics Electronics Technology Research Association, Tokyo (JP) --.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*